United States Patent
Li et al.

(10) Patent No.: US 11,559,791 B2
(45) Date of Patent: Jan. 24, 2023

(54) CARBON-DOPED NICKEL OXIDE CATALYST AND METHODS FOR MAKING AND USING THEREOF

(71) Applicant: The Regents of the University of California, Oakland, CA (US)

(72) Inventors: Yat Li, Santa Cruz, CA (US); Tianyi Kou, Santa Cruz, CA (US); Mingpeng Chen, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 88 days.

(21) Appl. No.: 17/153,383

(22) Filed: Jan. 20, 2021

(65) Prior Publication Data
US 2021/0220803 A1 Jul. 22, 2021

Related U.S. Application Data

(60) Provisional application No. 62/964,316, filed on Jan. 22, 2020, provisional application No. 62/992,650, filed on Mar. 20, 2020.

(51) Int. Cl.

| | | |
|---|---|---|
| *B01J 23/755* | (2006.01) | |
| *B01J 35/00* | (2006.01) | |
| *B01J 27/20* | (2006.01) | |
| *B01J 35/04* | (2006.01) | |
| *B01J 37/34* | (2006.01) | |
| *C01B 3/26* | (2006.01) | |
| *B01J 37/08* | (2006.01) | |
| *B82Y 30/00* | (2011.01) | |
| *B82Y 40/00* | (2011.01) | |

(52) U.S. Cl.
CPC .............. *B01J 23/755* (2013.01); *B01J 27/20* (2013.01); *B01J 35/0073* (2013.01); *B01J 35/04* (2013.01); *B01J 37/08* (2013.01); *B01J 37/348* (2013.01); *C01B 3/26* (2013.01); *B82Y 30/00* (2013.01); *B82Y 40/00* (2013.01); *C01B 2203/1058* (2013.01)

(58) Field of Classification Search
CPC ........ B01J 23/755; B01J 27/20; B01J 35/003; B01J 35/04; B01J 37/08; B01J 37/348; C01B 3/26; C01B 2203/1058; B82Y 30/00; B82Y 40/00
USPC .................................................. 502/185, 337
See application file for complete search history.

(56) References Cited

U.S. PATENT DOCUMENTS

| | | | |
|---|---|---|---|
| 7,375,053 B2 * | 5/2008 | Schmidt ................. | B01J 35/002 502/313 |
| 2010/0168257 A1* | 7/2010 | Duisberg ............... | B01J 23/894 502/328 |
| 2019/0245204 A1* | 8/2019 | Ozkan ............... | H01M 10/0568 |

FOREIGN PATENT DOCUMENTS

| | | | | |
|---|---|---|---|---|
| CN | 103646792 A | * | 3/2014 | ............. H01G 11/86 |
| CN | 107321379 A | * | 11/2017 | ............... C25B 1/04 |

(Continued)

OTHER PUBLICATIONS

Baroni, S., et al., "Phonons and Related Crystal Properties From Density-Functional Perturbation Theory", Rev. Mod. Phys., vol. 73, pp. 515-562 (2001).

(Continued)

*Primary Examiner* — Patricia L. Hailey
(74) *Attorney, Agent, or Firm* — Carter, DeLuca & Farrell LLP

(57) ABSTRACT

A catalyst composition including nickel foam and a plurality of carbon-doped nickel oxide nanorods disposed on the nickel foam.

19 Claims, 14 Drawing Sheets

(56) References Cited

FOREIGN PATENT DOCUMENTS

| CN | 108962632 A | * | 12/2018 | ............ | B82Y 30/00 |
| CN | 109003825 A | * | 12/2018 | ............ | B82Y 30/00 |
| CN | 105390702 B | * | 1/2019 | ............ | H01M 4/366 |

OTHER PUBLICATIONS

Cai, G.-F. et al., "An Efficient Route to a Porous NiO/Reduced Graphene Oxide Hybrid Film With Highly Improved Electrochramie Properties", Nanoscale, vol. 4, pp. 5724-5730 (2012).

Carney, C. S., et al., "Rapid Nickel Oxalate Thermal Decomposition for Producing Fine Porous Nickel Metal Powders", Part 1: Synthesis. Mater. Sci. Eng. A 431, pp. 1-12 (2006).

Chen, C., Levitin, G., Hess, D. W. & Fuller, T. F., "XPS Investigation of Nafion® Membrane Degradation", J. Power Sources, vol. 169, pp. 288-295 (2007).

Chen, Wei et al., "Understanding the Doping Effect in NiO: Toward High-Performance Inverted Pervskite Solar Cells", Advanced Energy Materials, vol. 8, pp. 1703519-1703519, (2018).

Dutta, T., et al., "Effect of Li Doping in NiO Thin Films on its Transparent and Conducting Properties and its Application in Heteroepitaxial p-n Junctions", J. Appl. Phys., vol. 108, 083715 (2010).

Garrity, K., et al., "Pseudopotentials for High-Throughput DFT Calculations", Computational Materials Science, vol. 81, pp. 446-452 (2014).

Gomaa, M. M., et al., "Exploring NiO Nanosize Structures for Ammonia Sensing", . Journal of Materials Science, Materials in Electronics, vol. 29, pp. 11870-11877 (2018).

Gong, M., et al., "Nanoscale Nickel Oxide/Nickel Heterostructures for Active Hydrogen Evolution Electrocatalysis", Nature Communications, vol. 5, 4695 pp. 106 (2014).

Gong, M., et al., "Blending $Cr_2O_3$ Into a NiO—Ni Electrocatalyst for Sustained Water Splitting", Angew. Chem. Int. Ed. 54, 11989-11993 (2015).

Gong, M., et al., "A Mini Review on Nickel-Based Electrocatalysts for Alkaline Hydrogen Evolution Reaction", Nano Research, vol. 9, pp. 28-46 (2016).

Greeley, J., et al., "Computational High-Throughput Screening of Electrocatalytic Materials for Hydrogen Evolution". Nature Materials, vol. 5, pp. 909-913 (2006).

Grosvenor, A. P., et al., "New Interpretations of XPS Spectra of Nickel Metal and Oxides", Surface Science 600, pp. 1771-1779 (2006).

Gunceler, D., et al., "The Importance of Nonlinear Fluid Response in Joint Density-Functional Theory Studies of Battery Systems", Model. Simul. Mater. Sci. Eng., vol. 21, 074005 (18 pages) (2013).

Henkelman, G., et al., "A Fast and Robust Algorithm for Bader Decomposition of Charge Density", Computational Materials Science, vol. 36, pp. 354-360 (2006).

Henkelman, G., et al., "A Climbing Image Nudged Elastic Band Method for Finding Saddle Points and Minimum Energy Paths", J. Chem. Phys. 113, 9901-9904 (2000).

Henkelman, G. et al., "A Dimer Method for Finding Saddle Points on High Dimensional Potential Surfaces Using Only First Derivatives", J. Chem. Phys. 111, 7010-7022 (1999).

Hu, C. et al., "In Situ Electrochemical Production of Ultrathin Nickel Nanosheets for Hydrogen Evolution Electrocatalysis", Chem 3, 122-133 (2017).

Huang, L. F. et al., "Improved Electrochemical Phase Diagrams From Theory and Experiment: the Ni-Water System and its Complex Compounds", J. Phys. Chem. C 121, 9782-9789 (2017).

Jang. W. et al., "Effect of Different Atmospheres on the Electrical Stabilization of NiO films", Vacuum 83, 596-598 (2008).

Kim, D., et al., "Air-Stable, Solution-Processed Oxide p—n Heterojunction Ultraviolet Photodetector", ACS Appl. Mater. Interfaces 6, 1370-1374 (2014).

Kou, T. et al., "Theoretical and Experimental Insight into the Effect of Nitrogen Doping on Hydrogen Evolution Activity of $Ni_3S_2$ in Alkaline Medium", Adv. Energy Mater. 8, 1703538 (2018).

Li, H.-Y., et al. "Nafion-Functionalized Electrospun Poly(Vinylidene Fluoride) (PVDF) Nanofibers for High Performance Proton Exchange Membranes in Fuel Cells", J. Mater. Chem. A 2, 3783-3793 (2014).

Li, L., "Antiferromagnetic Structures and Electronic Energy Levels at Reconstructed NiO (111) Surfaces: a DFT + U Study", Phys. Rev. B 91, 235304 (2015).

Liu, B., et al., "Doping High-Surface-Area Mesoporous $TiO_2$ Microspheres with Carbonate for Visible Light Hydrogen Production", Energy Environ. Sci. 7, 2592-2597 (2014).

Mansour, S. A. A., "Spectroscopic and Microscopic Investigations of the Thermal Decomposition Course of Nickel Oxysalts", Part 3. Nickel Oxalate Dihydrate. Thermochim. Acta 230, 243-257 (1993).

Mansour, A. N., "Characterization of NiO", XPS. Surf. Sci. Spectra 3, 231-238 (1994).

Marton, D, et al., "Carbon Nitride Deposited Using Energetic Species: A Two-Phase System", Phys. Rev. Lett. 73, 118-121 (1994).

Marzari, N., et al., "Thermal Contraction and Disordering of the Al (110) Surface", Phys. Rev. Lett. 82, No. 16, 3296-3299 (1999).

Zhang, W., et al., "Stability of the Polar NiO (111) Surface", J. Chem. Phys. 128, 124703 (2008).

McCrory, C. , et al., "Benchmarking Hydrogen Evolving Reaction and Oxygen Evolving Reaction Electrocatalysts for Solar Water Splitting Devices", J. Am. Chem. Soc. 137, pp. 4347-4357 (2015).

McCrory, C. et al., "Benchmarking Heterogeneous Electrocatalysts for the Oxygen Evolution Reaction", J. Am. Chem. Soc. 135, 16977-16987 (2013).

Nørskov, J. K. et al., "Trends in the Exchange Current for Hydrogen Evolution". J. Electrochem. Soc. 152, J23-J26 (2005).

Ping, Y., Nielsen, R. J. & Goddard, W. A., "The Reaction Mechanism With Free Energy Barriers at Constant Potentials for the Oxygen Evolution Reaction at the $IrO_2$ (110) Surface". J. Am Chem. Soc. 139, 149-155 (2017).

Pwerdew, John P., "Generalized Gradient Approximation Made Simple", vol. 77, No. 18, 3865(4) (1996).

Rohrbach, A., etl., "Molecular Adsorption on the Surface of Strongly Correlated Transition-Metal Oxides: A case study for CO/NiO (100)", Phys. Rev. B 69, 075413 (2004).

Romanyuk, O. et al., "Study of Ni-Catalyzed Graphitization Process of Diamond by in situ X-ray Photoelectron Spectroscopy", J. Phys. Chem. C 122, 6629-6636 (2018).

Sasi, B. et al, "Nanostructured Mesoporous Nickel Oxide Thin Films", Nanotechnology 18, 115613 (2007).

Sheng, W, et al., "Hydrogen Oxidation and Evolution Reaction Kinetics on Platinum: Acid vs Alkaline Electrolytes", J. Electrochem. Soc. 157, B1529-B1536 (2010).

Silva, R., et al., "Efficient Metal-Free Electrocatalysts for Oxygen Reduction: Polyaniline-Derived N- and O-doped Mesoporous Carbons", J. Am. Chem. Soc. 135, 7823-7826 (2013).

Snir, N. et al., "Progress in Understanding Hematite Electrochemistry Through Computational Modeling", Comput. Mater. Sci. 160, 411-419 (2019).

Su, W., et al., "Indirect Electrochemical Detection of NADH Through an Active Stainless Steel Fiber Felt (SSFF) Electrode Decorated with the Amino Graphene/Nafion Nano Composite Films", Chemistry Select 3, 6214-6220 (2018).

Tomellini, M., "X-ray Photoelectron Spectra of Defective Nickel Oxide", J. Chem. Soc., Faraday Trans. 1 84, 3501-3510(1988).

Trout, B. L. , et al., "Analysis of the Dissociation of $H_2O$ in Water Using First-Principles Molecular Dynamics", J. Phys. Chem. B 103, 7340-7345 (1999).

Wang, J., et al., "Non-Noble Metal-Based Carbon Composites in Hydrogen Evolution Reaction: Fundamentals to Applications", Adv. Mater. 29, 1605838 (2017).

Wang, J. et al., "Dominating role of Ni0 on the interface of Ni/NiO for enhanced hydrogen evolution reaction", ACS Appl. Mater. Interfaces 9, 7139-7147 (2017).

Wu, Y. et al., "Electron Density Modulation of $NiCo_2S_4$ Nanowires by Nitrogen Incorporation for Highly Efficient Hydrogen Evolution Catalysis", Nat Commun. 9, 1425 (2018).

(56) References Cited

OTHER PUBLICATIONS

Xu, J., et al., "High Capacity Silicon Electrodes with Nafion as Binders for Lithium-ion Batteries", J. Electrochem. Soc. 163, A401-A405 (2016).

Yan, X., et al., "Crystalline/Amorphous Ni/NiO Core/Shell Nanosheets as Highly Active Electrocatalysts for Hydrogen Evolution Reaction", J. Power Sources 300, 336-343 (2015).

Yang, W. et al., "NiO Nanorod Array Anchored Ni Foam as a Binder-Free Anode for High-Rate Lithium Ion Batteries", J. Mater. Chem. A 2, 20022-20029 (2014).

Zeng, K et al., "Recent Progress in Alkaline Water Electrolysis for Hydrogen Production and Applications," Prog. Energy Combust. Sci. 36, 307-326 (2010).

Zhang, T et al., "Engineering Oxygen Vacancy on NiO Nanorod Arrays for Alkaline Hydrogen Evolution", Nano Energy 13, 103-109 (2018).

Zhang, J. Y et al., "Electronic and Transport Properties of Li-Doped NiO Epitaxial Thin Films", J. Mater. Chem. C 6, 2275-2282 (2018).

Zhao, W et al., "Water Dissociative Adsorption on NiO (111): Energetics and Structure of the Hydroxylated Surface", ACS Catal. 6, 7377-7384 (2016).

\* cited by examiner

O-surface

C-surface

CARBON-DOPED NICKEL OXIDE CATALYST AND METHODS FOR MAKING AND USING THEREOF

CROSS-REFERENCE TO RELATED APPLICATION

The present application claims the benefit of and priority to U.S. Provisional Application No. 62/964,316, filed on Jan. 22, 2020 and U.S. Provisional Application No. 62/992,650, filed on Mar. 20, 2020. The entire disclosures of each of the foregoing applications are incorporated by reference herein.

GOVERNMENT LICENSE RIGHTS

This invention was made with Government support under Grant No. NNX15AQ01, awarded by Merced Nanomaterials Center for Energy and Sensing (MACES), a NASA funded MIRO center. The Government has certain rights in the invention.

BACKGROUND

Water electrolysis represents a sustainable and environmentally friendly method to generate hydrogen fuel. Since a proton rich environment is favorable for hydrogen adsorption on a catalyst surface, an acidic electrolyte is preferable for hydrogen evolution reaction (HER). However, acidic conditions prohibit the use of non-platinum group metals as catalysts. In addition, the corrosive acidic fog generated by the acidic electrolyte not only contaminates the hydrogen gas produced, but also causes severe chemical corrosion of electrolyzers. These factors add significant costs to hydrogen generation and pose barriers for constructing large-scale electrolyzers.

Alkaline electrolytes with a low vapor pressure and a relatively mild chemical environment could avoid these issues. In particular, non-platinum group metals such as nickel (Ni) can be used as electrocatalyst/electrode for alkaline water electrolysis. However, a major challenge for alkaline water electrolysis is the requirement of an additional water dissociation step (i.e. the cleavage of the strong H—OH bond) for generating the essential H atom intermediates for HER. The high activation barrier of water dissociation makes HER very sluggish in an alkaline medium. Thus, platinum (Pt) typically exhibits two orders of magnitude lower exchange current density in alkaline solution than in acidic solution. Accordingly, there is a need to develop alkaline HER catalysts that include both hydrogen adsorption sites as well as water adsorption and dissociation sites.

SUMMARY

The present disclosure provides for using transition metal oxides, such as nickel oxide (NiO), to form alkaline HER catalysts. Since Ni sites in NiO possess incompletely filled d orbitals, Ni sites serve as active sites for water adsorption and dissociation in alkaline electrolyte. Performance of conventional NiO-based catalysts is not comparable to conventional Pt-based catalysts. One of the possible reasons is lack of hydrogen adsorption sites in NiO-based catalysts. Efforts to integrate NiO with metallic Ni, which provides hydrogen adsorption sites, have further reduced the overpotential for alkaline HER to about 80 mV at $j_{geo}$ of about 10 mA/cm$^2$. In addition, metallic Ni is susceptible to oxidation, which affects the stability of the NiO/Ni integrated catalyst. Moreover, given that only the Ni/NiO interface has the synergistic effect in alkaline HER, the integrated system is not capable of fully utilizing the catalyst's surface area.

The present disclosure provides for an NiO-based catalyst having hydrogen adsorption sites achieved through heteroatom doping. In particular, a carbon-doped $Ni_{1-x}O$ is disclosed, having an overpotential of about 27 mV at $j_{geo}$ of 10 mA/cm$^2$ and a small Tafel slope of about 36 mV/dec in 1M KOH solution, which is comparable to the performance of a benchmark platinum-on-carbon catalyst (Pt/C) catalyst (about 14 mV at $j_{geo}$ of 10 mA/cm$^2$ and a Tafel slope of about 29 mV/dec). Structural analysis of the catalyst demonstrated that the carbon dopant substitutionally replaces a third-layer 6-coordinated Ni in NiO. Density functional theory (DFT) simulation further supports that the carbon dopant distorts the local structure of NiO and decreases the coordination number of Ni. These under-coordinated Ni sites are highly favorable for hydrogen adsorption. In addition, the carbon sites serve as the "hot spots" for water dissociation with a low energy barrier of about 0.81 eV.

According to one embodiment of the present disclosure, a catalyst composition is disclosed. The catalyst composition includes nickel foam and a plurality of carbon-doped nickel oxide nanorods disposed on the nickel foam.

According to one aspect of the above embodiment, each of the carbon-doped nickel oxide nanorods includes a plurality of nanoparticle subunits each having a nickel core covered by a carbon-doped nickel oxide shell. The core consists substantially of nickel. The carbon-doped nickel oxide shell consists substantially of nickel oxide. The carbon-doped nickel oxide shell also includes a carbon-doped surface. The carbon-doped surface includes a carbon atom bonded to three oxygen atoms in the same plane. The carbon-doped surface includes a carbon atom that substitutionally replaced a third-layer 6-coordinate nickel atom in the nickel oxide.

According to another aspect of the above embodiment, the catalyst composition has an overpotential of about 27 millivolts at a geometric current density of about 10 milliamps per square centimeter.

According to another embodiment of the present disclosure, a method for forming a catalyst composition is disclosed. The method includes anodizing nickel foam to form an anodized nickel foam having a plurality of NiC$_2$O$_4$.2H$_2$O bulk crystals coated on the nickel foam. The method also includes annealing the anodized nickel foam to form a plurality of carbon-doped nickel oxide nanorods.

According to one aspect of the above embodiment, annealing the anodized nickel foam includes changing the morphology of the plurality of NiC2O4.2H2O bulk crystals into the plurality of carbon-doped nickel oxide nanorods. Anodizing the nickel foam includes anodizing the nickel foam with a nickel electrode in an oxalic acid solution. Further, anodizing the nickel foam is performed at a temperature from about −10° C. to about 0° C. at a constant voltage from about 100 V to about 30 V for a period of time from about 20 minutes to about 5 minutes.

According to another aspect of the above embodiment, the nickel foam has a bulk density from about 400 grams per square meter to about 300 grams per square meter.

According to a further aspect of the above embodiment, annealing is performed in an argon atmosphere at a temperature from about 500° C. to about 300° C. for a period of time from about 1 hour to about 30 minutes.

According to a further embodiment of the present disclosure, a method for producing hydrogen is disclosed. The method includes contacting at least one hydrogen-containing compound with a catalyst composition under conditions suitable for dehydrogenating the at least hydrogen-containing compound to form hydrogen. The catalyst composition includes: nickel foam and a plurality of carbon-doped nickel oxide nanorods disposed on the nickel foam. According to one aspect of the above embodiment, each of the carbon-doped nickel oxide nanorods includes a plurality of nanoparticle subunits each having a core covered by a carbon-doped nickel oxide shell. The core consists substantially of nickel and the carbon-doped nickel oxide shell consists substantially of nickel oxide and includes a carbon-doped surface. The carbon-doped surface includes a carbon atom bonded to three oxygen atoms in a same plane. The carbon-doped surface also includes a carbon atom that substitutionally replaced a third-layer 6-coordinate nickel atom in the nickel oxide.

BRIEF DESCRIPTION OF DRAWINGS

The patent or application file contains at least one drawing executed in color. Copies of this patent or patent application publication with color drawing(s) will be provided by the Office upon request and payment of the necessary fee.

Some of the drawings are better appreciated when presented in color. Applicant has submitted color versions of these drawings and considers those color versions part of the original disclosure. Applicant reserves the right to use those color versions in later proceedings.

Figure 1:
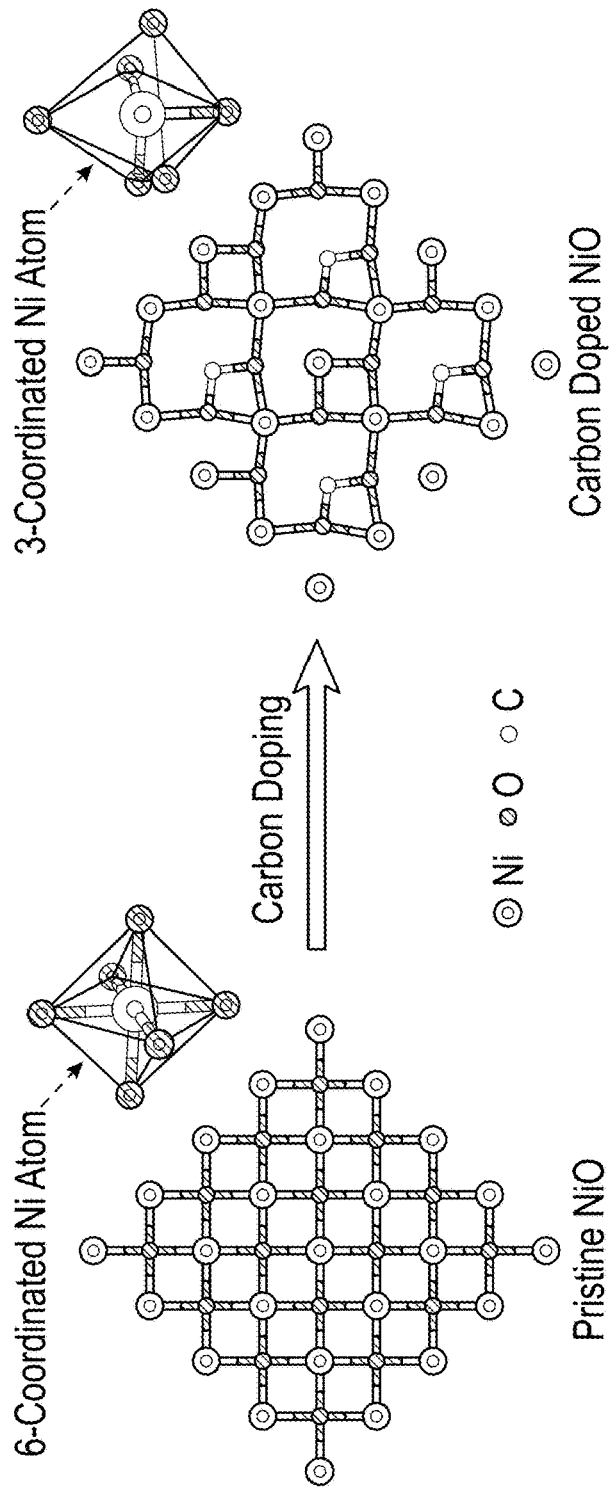
Figure 2:
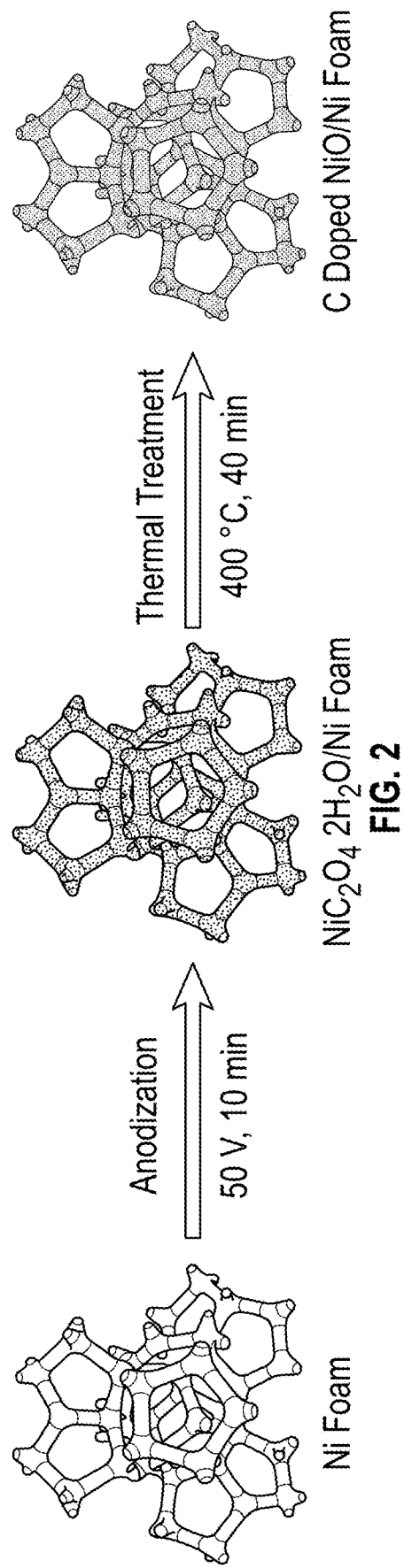
Figure 3C:
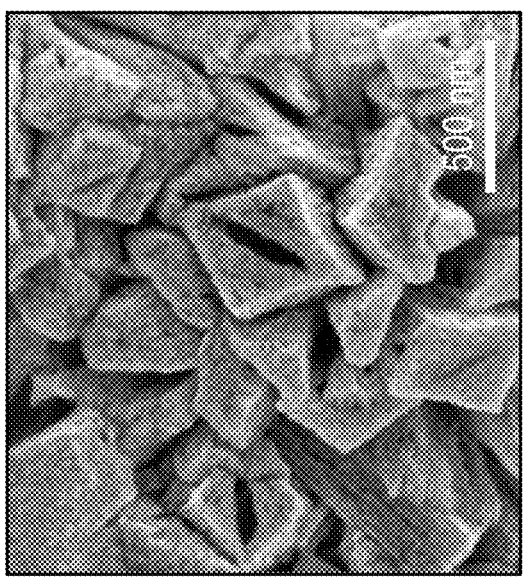
Figure 3B:
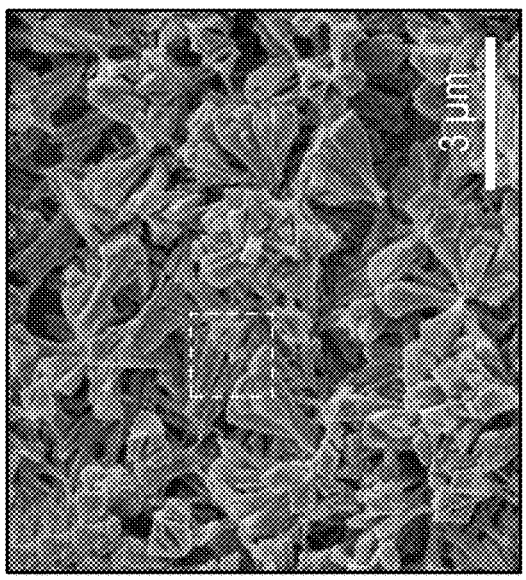
Figure 3A:
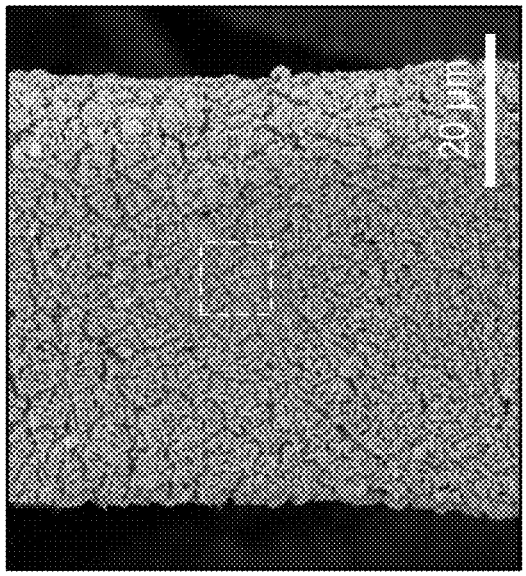
Figure 3F:
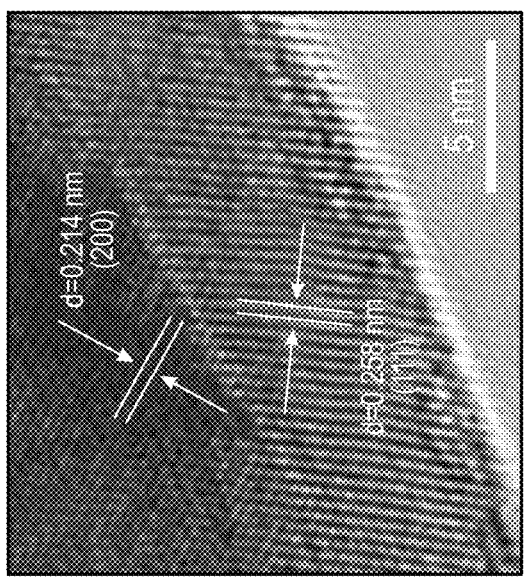
Figure 3E:
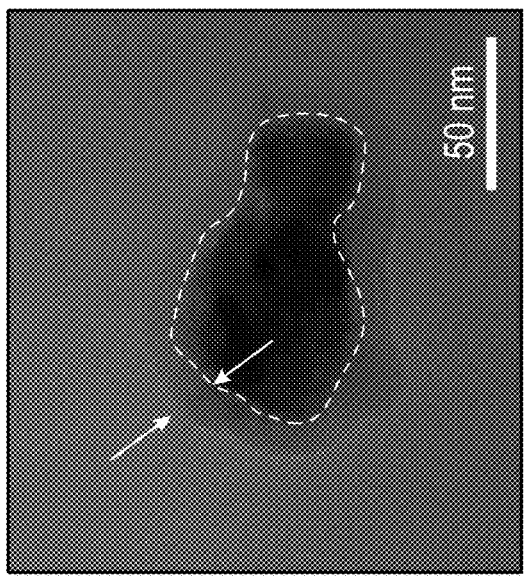
Figure 3D:
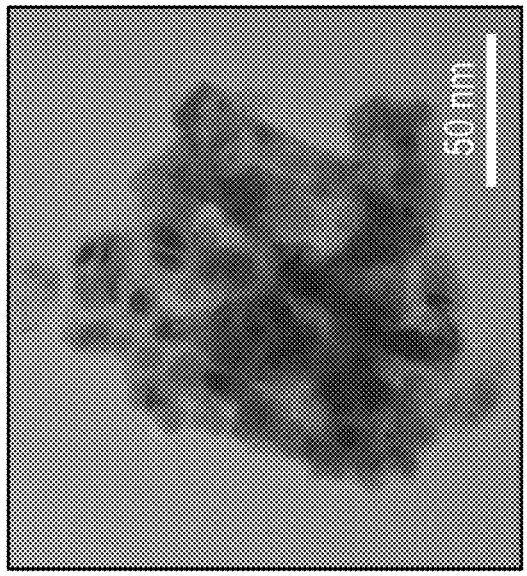
Figure 4A:
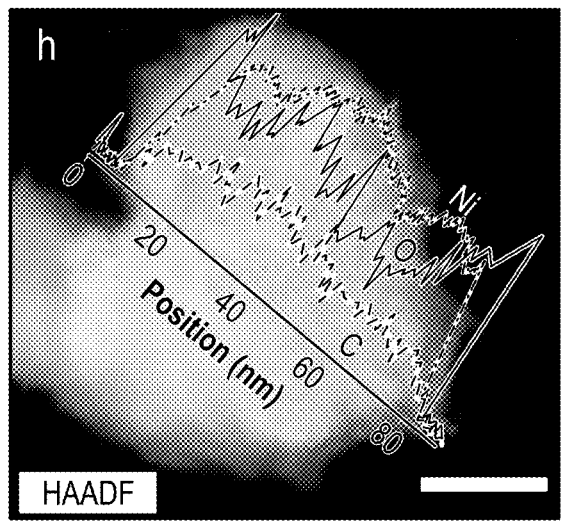
Figure 4B:
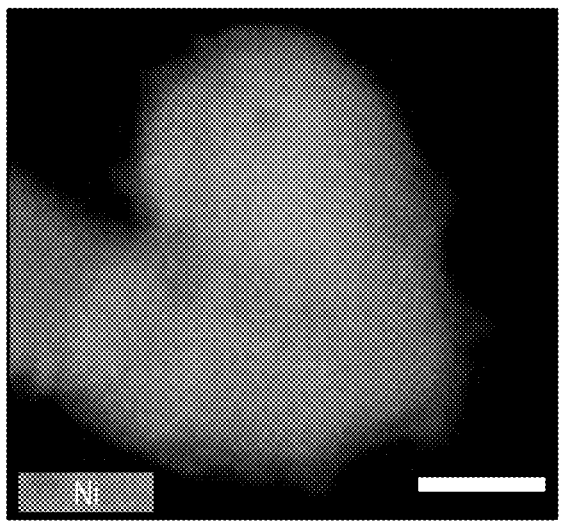
Figure 4C:
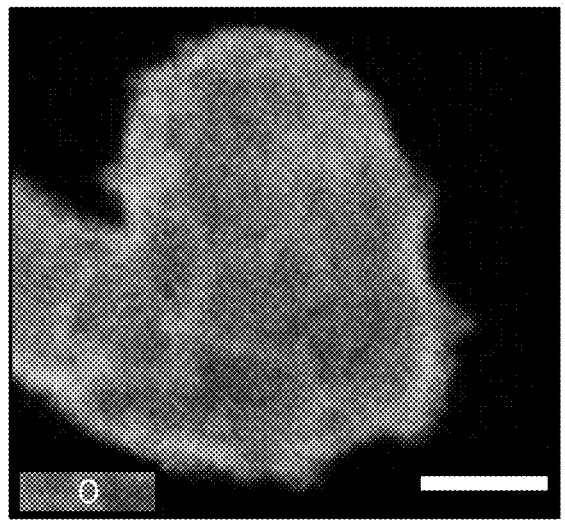
Figure 4D:
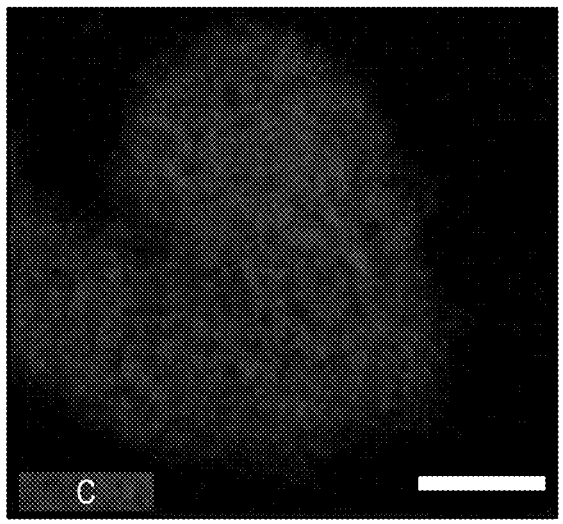
Figure 5:
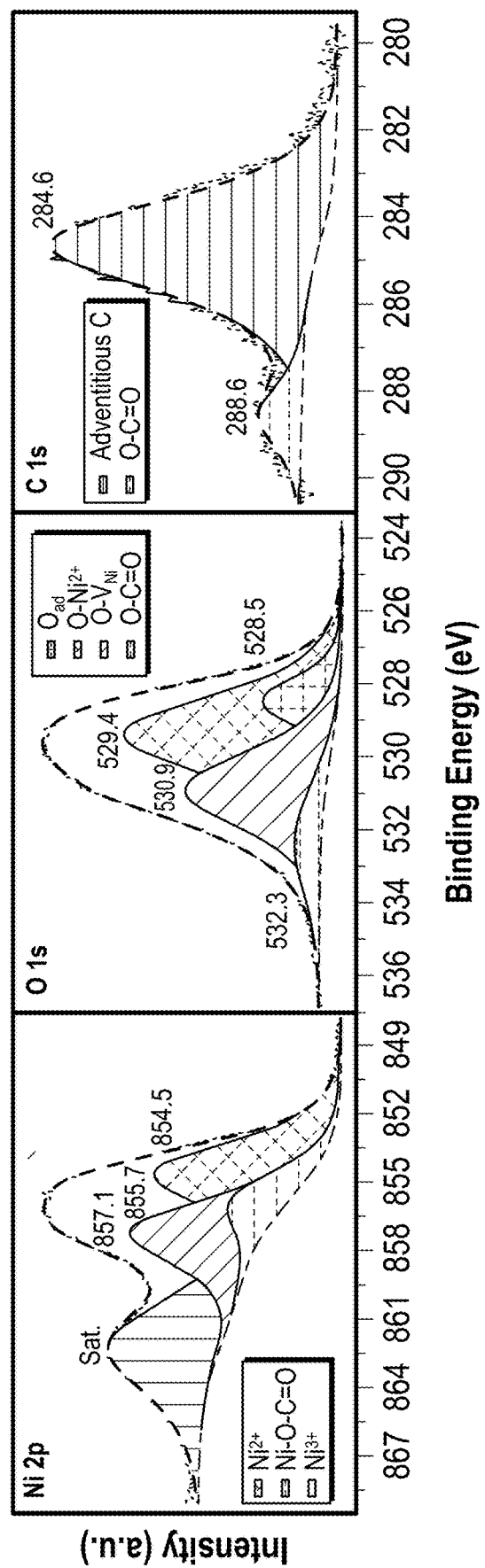
Figure 6:
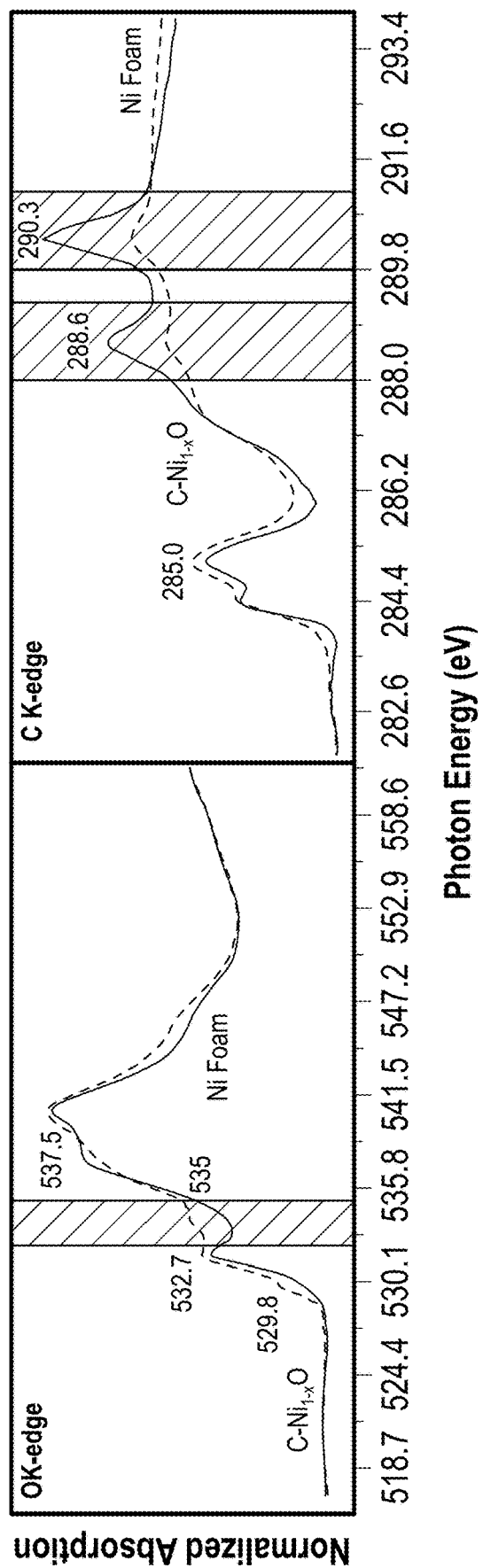
Figure 8:
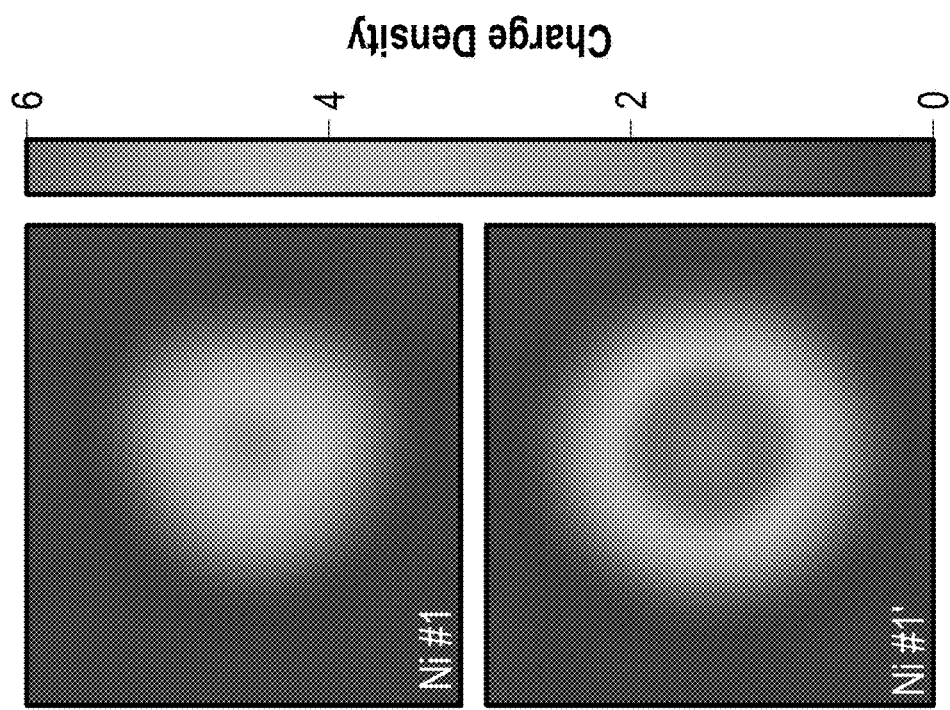
Figure 7A:
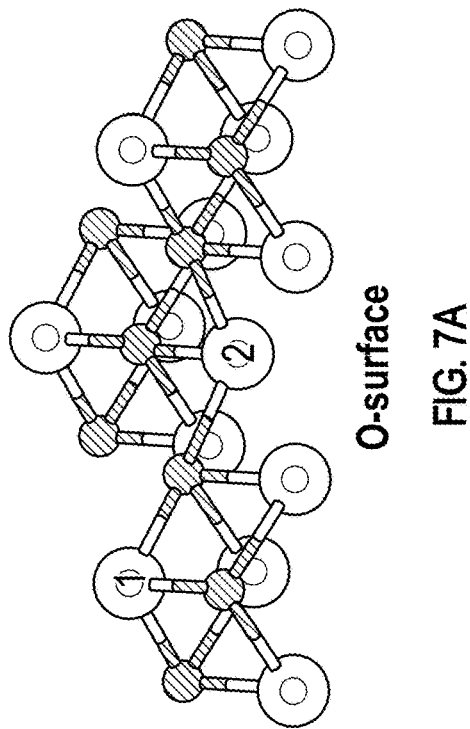
Figure 7B:
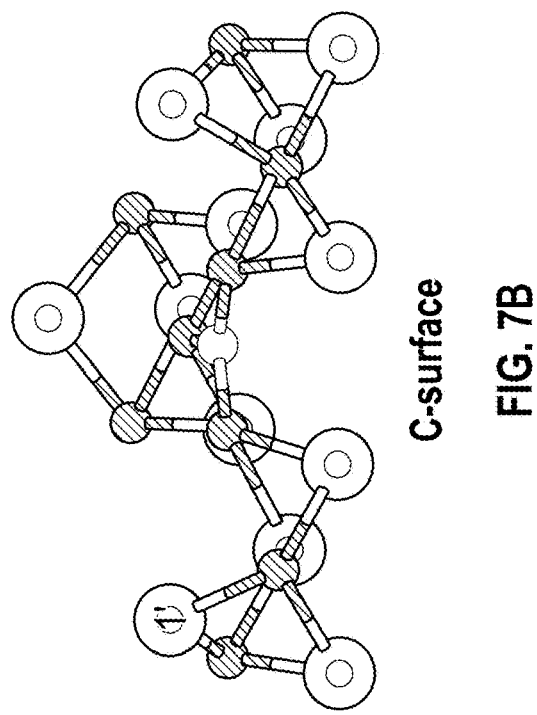
Figure 9A:
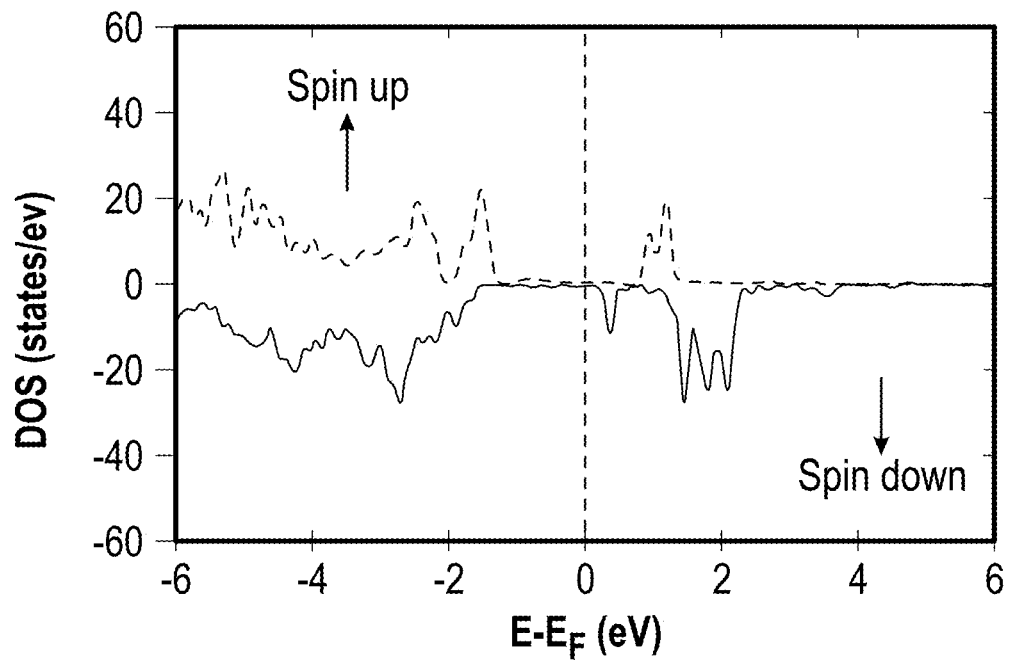
Figure 9B:
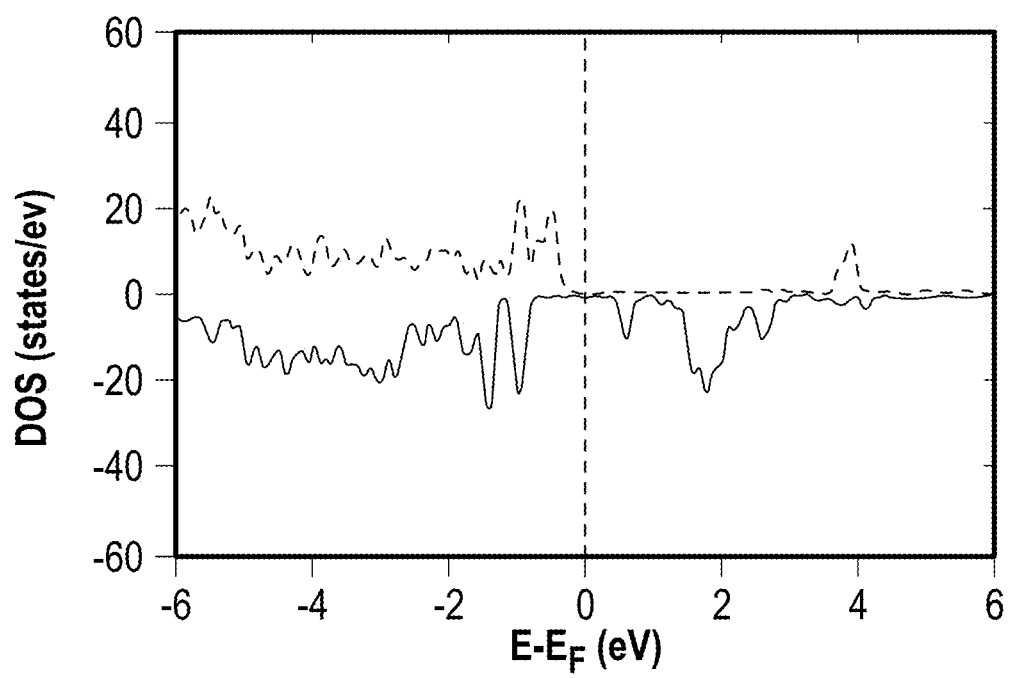
Figure 9C:
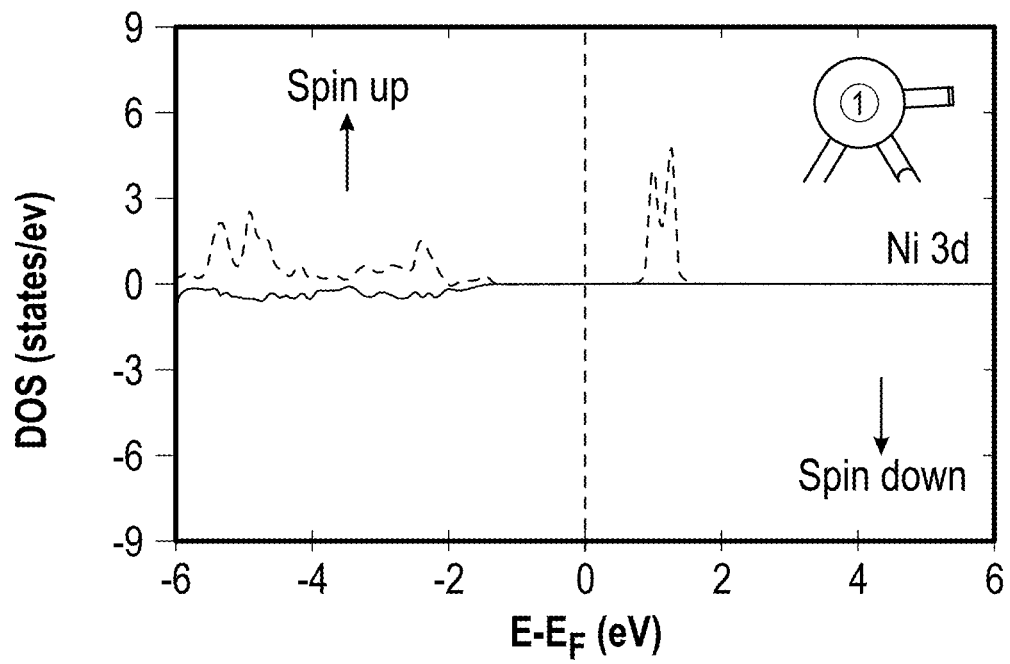
Figure 9D:
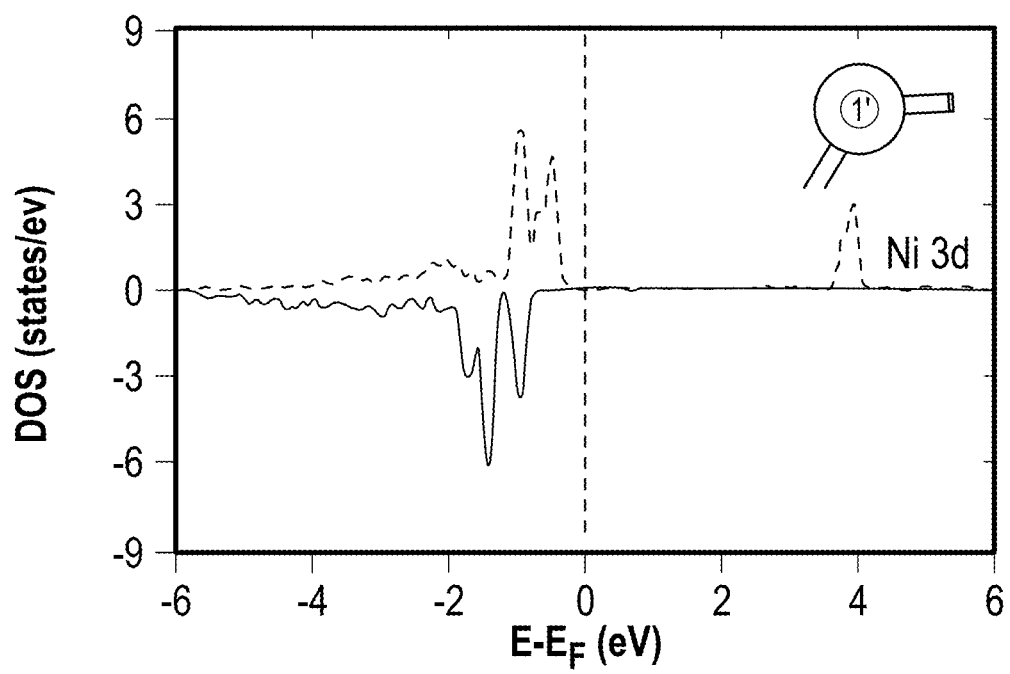
Figure 10:
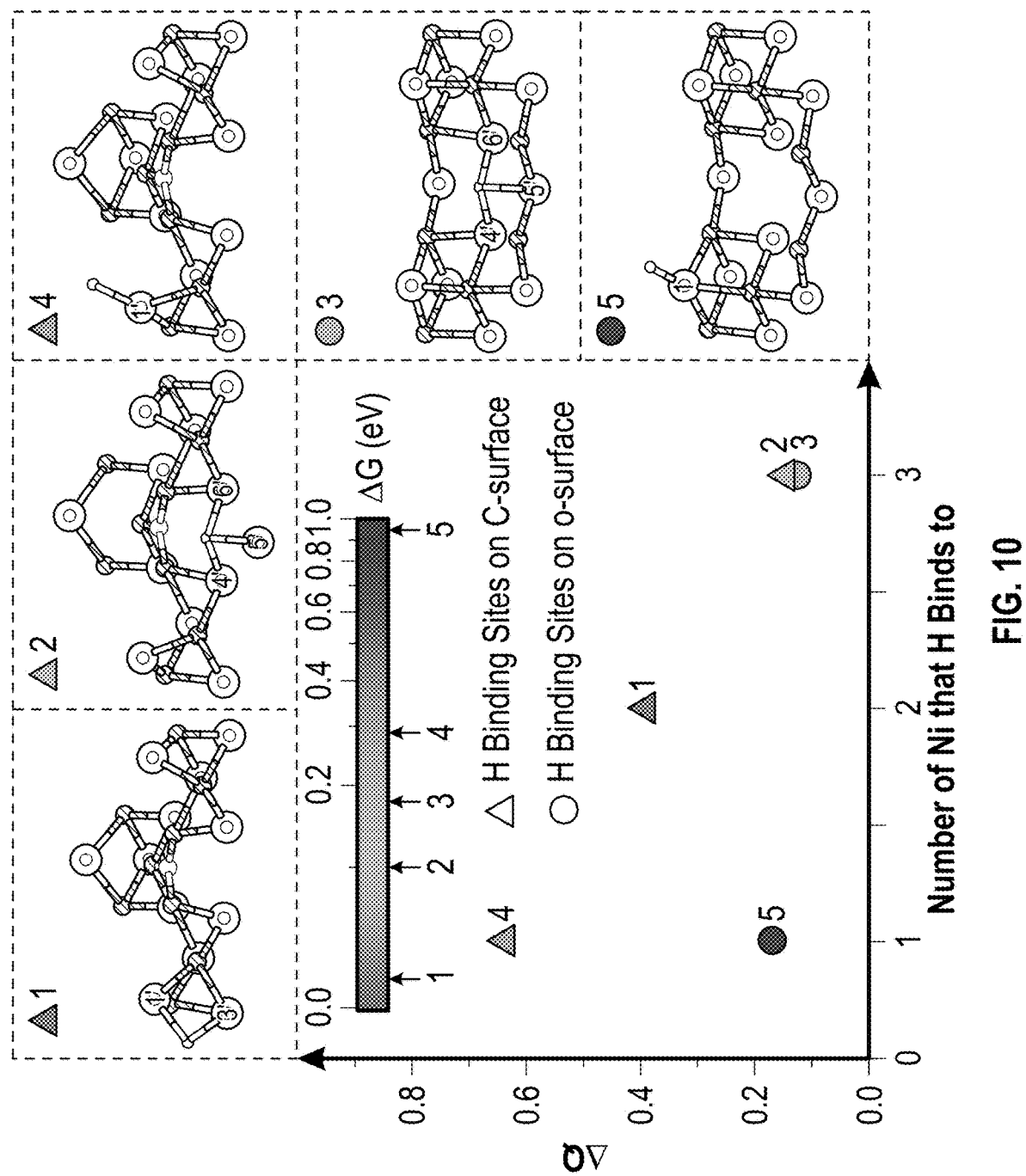
Figure 12:
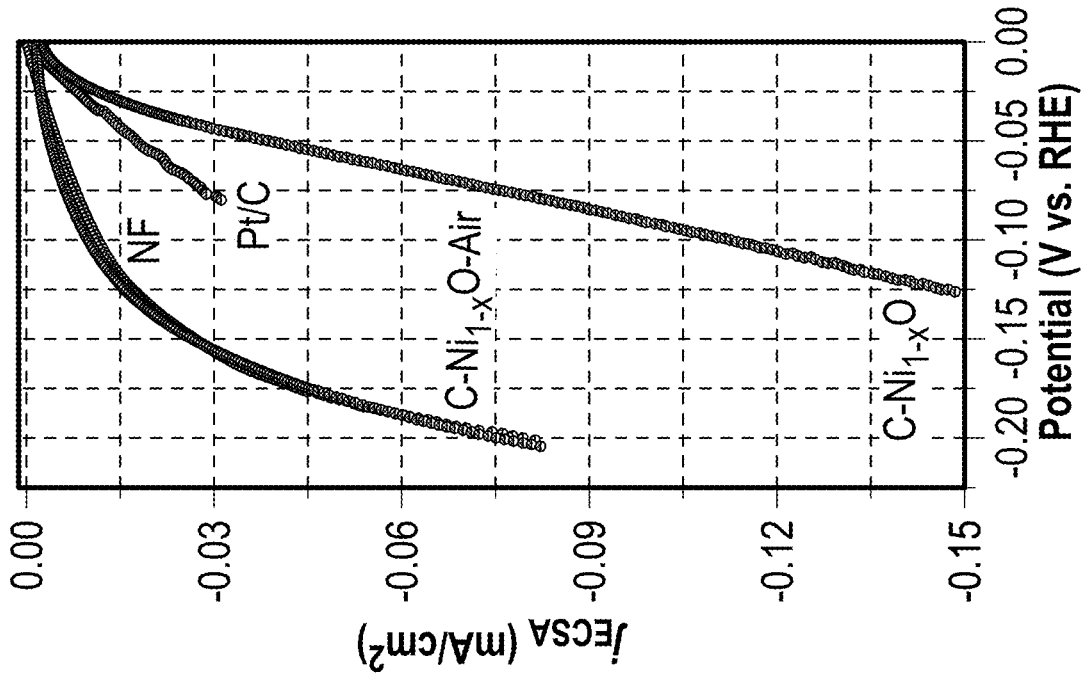
Figure 11:
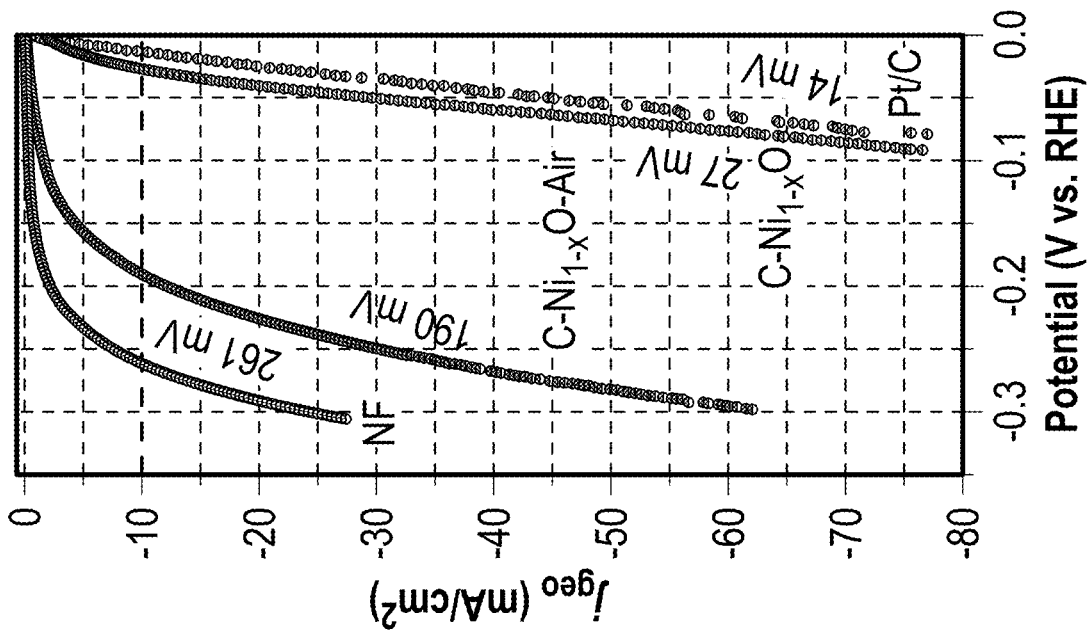
Figure 13:
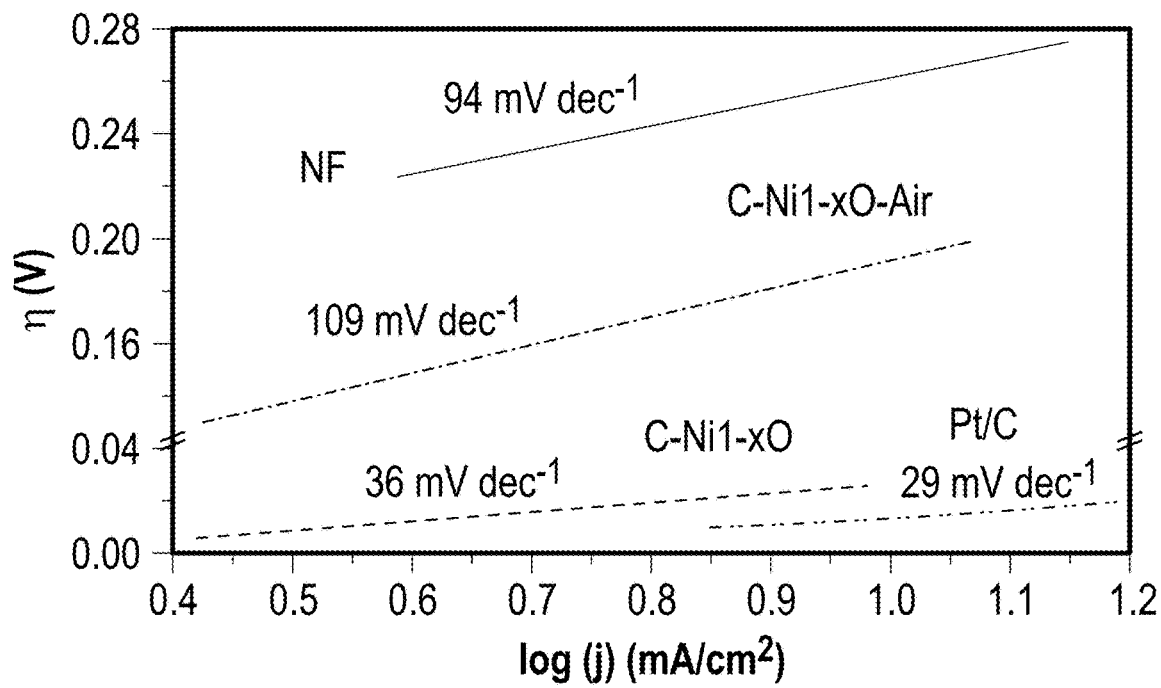
Figure 14:
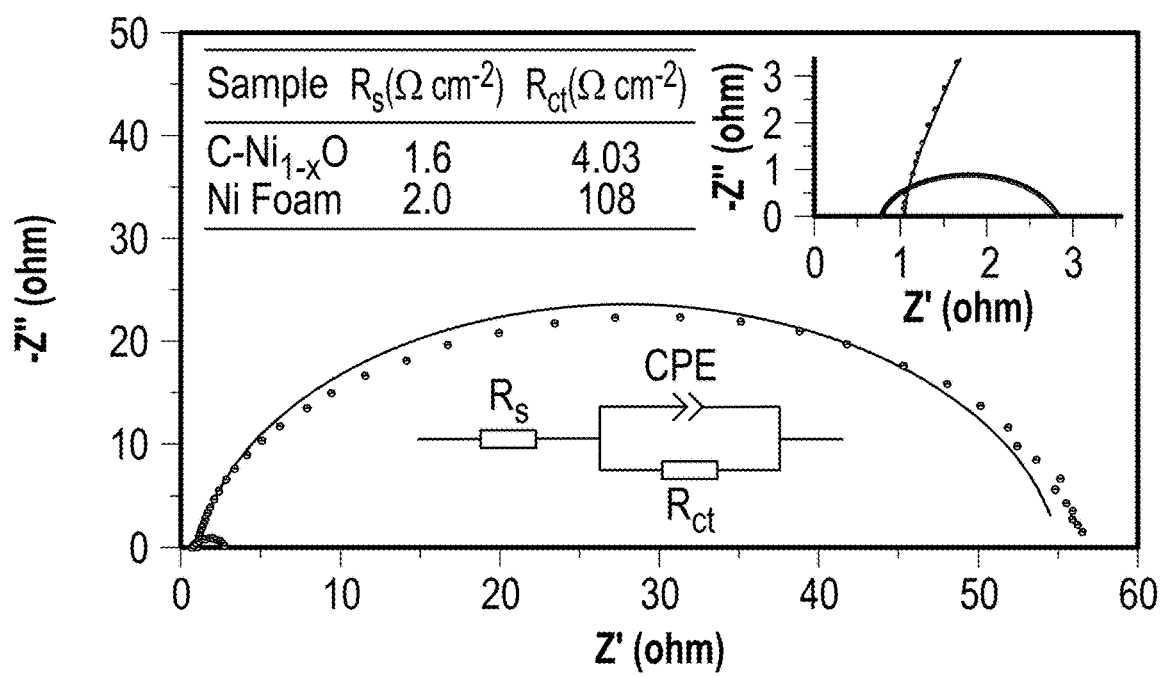
Figure 15:
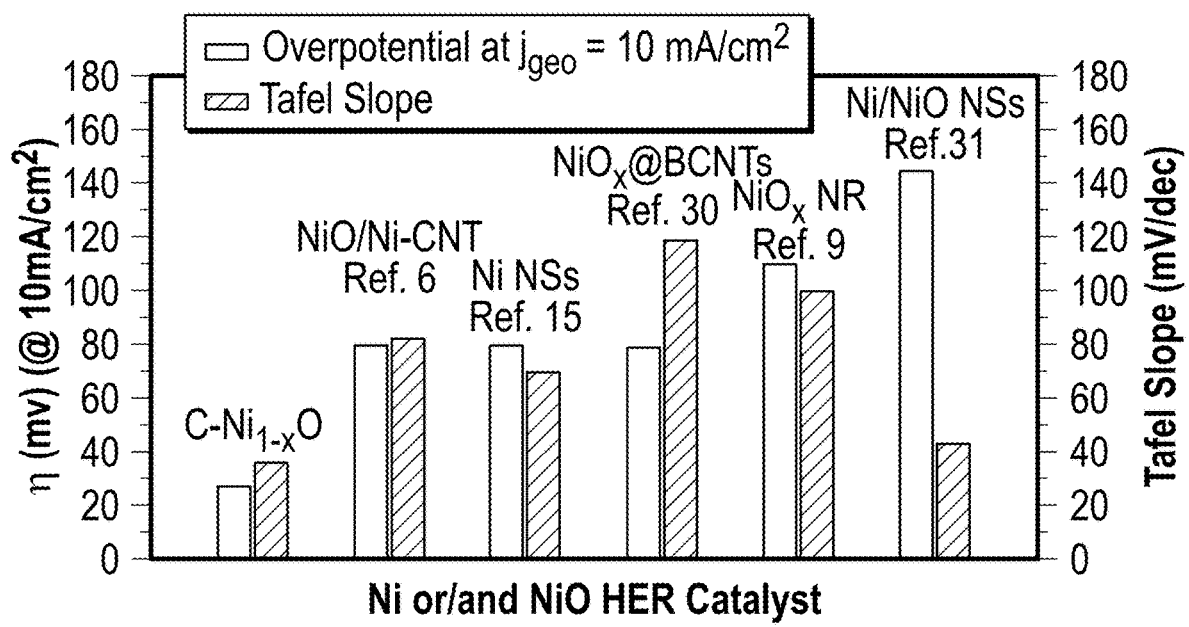
Figure 16:
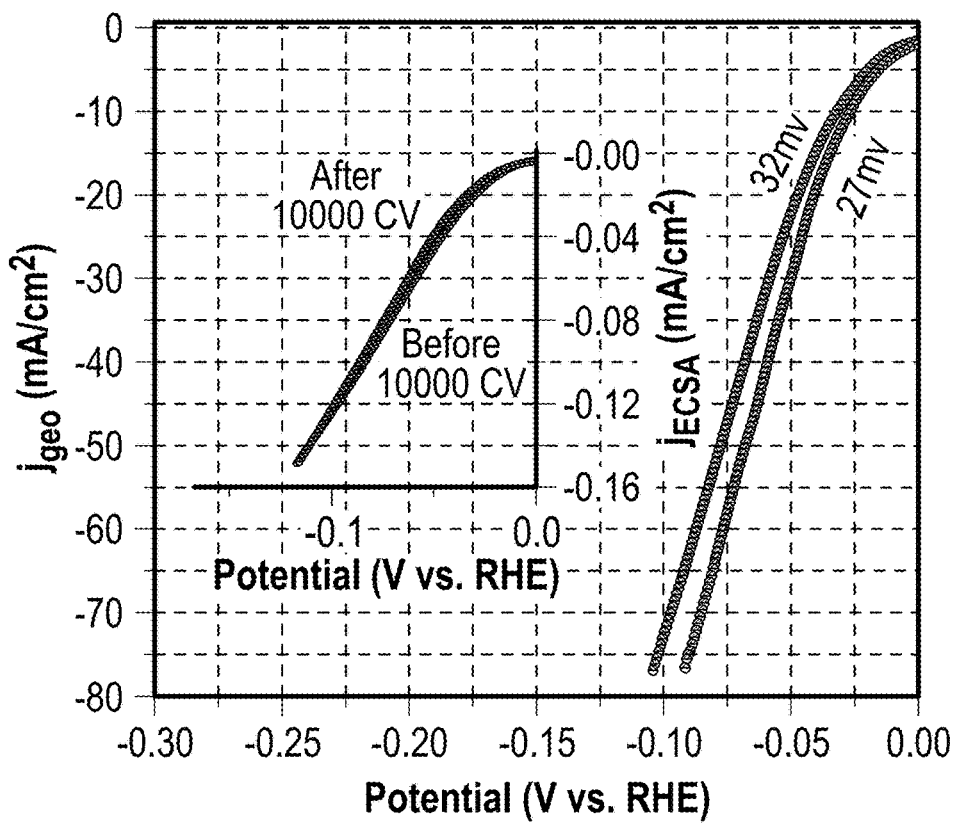
Figure 17:
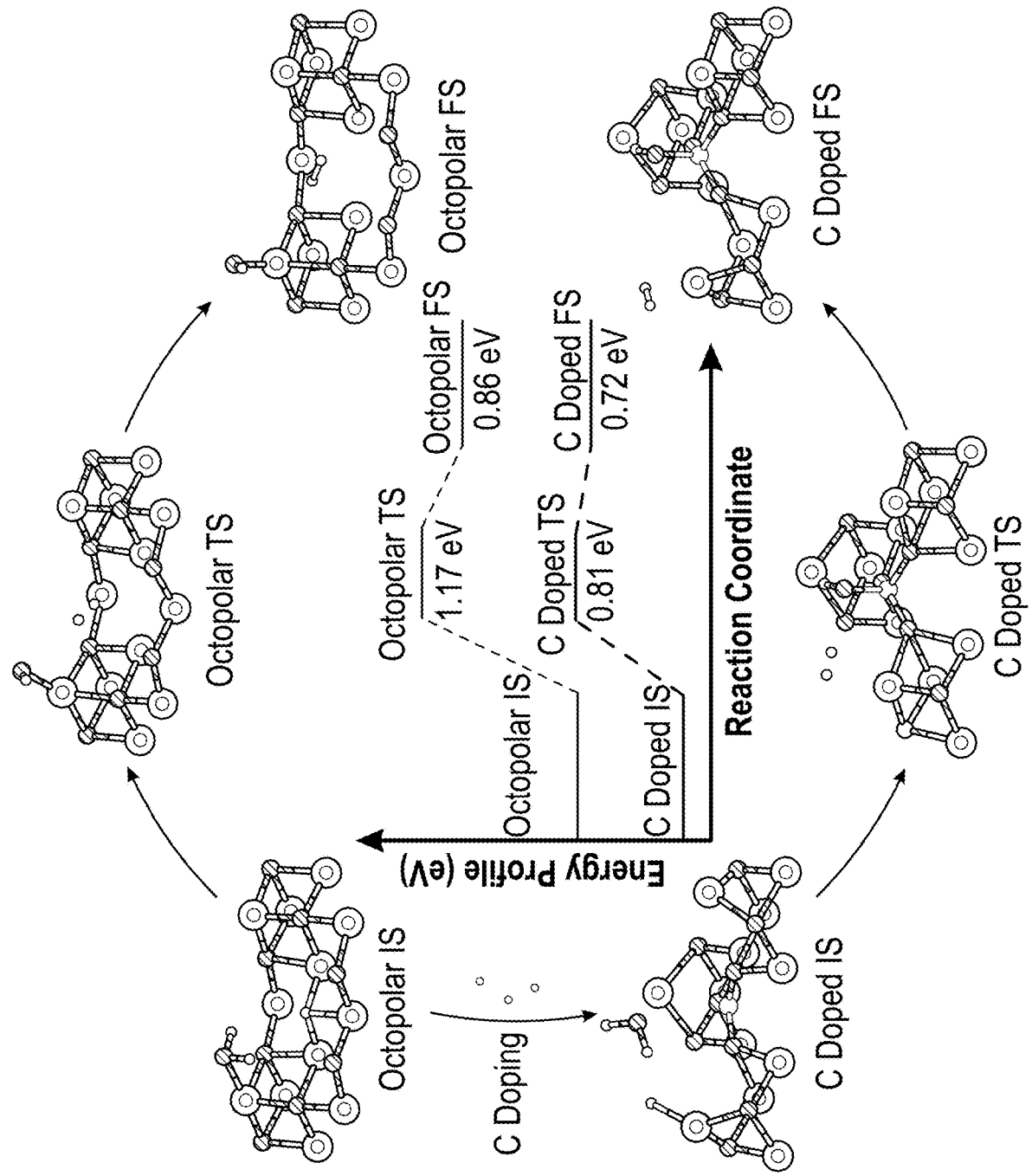

Various embodiments of the present disclosure are described herein below with reference to the figures wherein:

FIG. 1 shows a DFT calculated structure of pristine bulk NiO and carbon-doped bulk NiO according to the present disclosure;

FIG. 2 shows a schematic illustration of a synthesis of a catalyst composition (C—$Ni_{1-x}O$) including carbon-doped NiO on Ni foam substrate according to the present disclosure;

FIG. 3A is a scanning electron microscope (SEM) image of the carbon-doped NiO nanorod/Ni foam (NF) at 20 μm scale according to the present disclosure;

FIG. 3B is a magnified view of a dashed portion of FIG. 3a of the carbon-doped NiO nanorod/NF at 3 μm scale according to the present disclosure;

FIG. 3C is a magnified view of a dashed portion of FIG. 3b of the carbon-doped NiO nanorod/NF at 500 nm scale according to the present disclosure;

FIGS. 3D and 3E are high-resolution (HR) transmission electron microscopy (TEM) images of nanoparticles of the carbon-doped NiO nanorod/NF at 50 nm scale according to the present disclosure;

FIG. 3F is an HR-TEM image collected at the edge of the nanoparticle of FIGS. 3d and e at a 5 nm scale according to the present disclosure;

FIGS. 4A-D are high-angle annular dark field (HAADF)-TEM images at 20 nm scale of a nanoparticle of the carbon-doped NiO nanorod/NF and the corresponding electron energy loss spectroscopy (EELS) elemental mapping of Ni (FIG. 4b), O (FIG. 4c), and C (FIG. 4d) with the inset of FIG. 4a showing corresponding line scans;

FIG. 5 shows Ni 2p, O 1s, and C 1s X-ray photoelectron spectroscopy (XPS) spectra collected from C—$Ni_{1-x}O$ particles, with solid curve showing experimental data and dashed curve showing the summation of the deconvoluted peaks (shaded regions);

FIG. 6 shows O K-edge and C K-edge X-ray absorption near edge spectroscopy (XANES) spectra of C—$Ni_{1-x}O$ (red/dashed curve) and NF (black/solid curve);

FIGS. 7A and 7B show the structures of octupolar surface (o-surface) and carbon-doped surface (C-surface), respectively, with numbers labeling different Ni sites;

FIG. 8 shows charge density mappings of the top layer Ni (#1 and 1' sites) on o-surface (top diagram) and C-surface (bottom diagram);

FIGS. 9A and 9B show projected density of states (PDOS) plots of the Ni 3d and O 2p orbitals of the first three layers from the o-surface and C-surface, respectively;

FIGS. 9C and 9D show PDOS plots of the 3d orbitals of Ni on o-surface (Ni #1) and C-surface (Ni #1'), respectively;

FIG. 10 shows Gibbs free energy change of H adsorption ($\Delta G_H$) as a function of atomic charge difference ($\Delta Q$) and the number of Ni that H binds to, with the five points representing five different H adsorption sites on o-surface and C-surface, which are also illustrated;

FIG. 11 shows HER polarization curves obtained from C—$Ni_{1-x}O$, NF, C—$Ni_{1-x}O$ annealed in air (C—$Ni_{1-x}O$-Air), and Pt/C in 1.0 M KOH saturated with nitrogen at a scan rate of about 1 mV/s;

FIG. 12 shows HER polarization curves obtained from the compositions of FIG. 11 under the same conditions with current normalized to electrochemical surface area (ECSA);

FIG. 13 shows Tafel plots the compositions of FIG. 11;

FIG. 14 shows electrochemical impedance spectra of the NF and C—$Ni_{1-x}O$ measured at the potential of −0.15 V vs RHE, with frequency ranging from 100 kHz to 1 Hz and an amplitude of 5 mV, with the inset showing a higher scale of the spectra and dots are experimental data and solid lines are simulated results based on an equivalent circuit;

FIG. 15 shows bar graphs comparing overpotential at 10 mA/cm$^2$ and Tafel slopes of C—$Ni_{1-x}O$, NiO/Ni-carbon nanotube (CNT), Ni nanosheets (NSs), NiOx@Bamboo-like CNTs (BCNTs), $NiO_x$ nanorods (NRs), and Ni/NiO NSs;

FIG. 16 shows HER polarization curves of the C—Ni1-xO using iR corrected data collected before and after 10,000 cycles with an inset showing the polarization curves with current normalized to ECSA; and FIG. 17 is a schematic diagram of the reaction energy profile of the Heyrovsky step for o-surface and C-surface with the corresponding initial state (IS), transition state (TS) and final state (FS) structures for o-surface and C-surface listed in the surrounding circle.

DETAILED DESCRIPTION

Hydrogen adsorption property of an HER catalyst is determined by its surface electronic structure and coordination geometry. The present disclosure provides heteroatom dopant to modulate the electron density and the coordination number of active sites of a catalyst composition, and consequently adjust their hydrogen adsorption behavior. Suitable dopants include carbon. The present disclosure also employs density functional theory (DFT) calculations to investigate the possible impact of carbon doping on the coordination geometry of NiO.

With reference of FIG. 1, which shows the structure of pristine and carbon-doped NiO bulk. In pristine NiO, Ni is 6-coordinated. Carbon-doping causes the distortion of the NiO local structure because of the mismatch of the radius and coordination number between carbon and Ni. The distortion creates enough tensile strain on the Ni—O bond and subsequently cleaves the bond. As a result, the cleavage reduces the coordination number of Ni from 6 to 3, which increases the charge density of Ni as shown in FIG. 8b. Thus, the under-coordinated Ni also acts as active H adsorption sites in NiO. In addition, the high affinity of carbon to oxo groups also promotes water adsorption or dissociation.

With reference to FIG. 2, the catalyst composition may be formed by anodizing nickel foam. Nickel foam may have a bulk density from about 400 grams per square meter to about 300 grams per square meter, and in embodiments may be 350 grams per square meter. Nickel foam may be anodized with a nickel counter electrode in, for example, an oxalic acid solution. In embodiments, the oxalic acid solution may have a concentration from about 0.1 M to about 0.5 M, which in embodiments may be 0.3 M. Anodization may be carried out at a temperature from about −10° C. to about 0° C., and in embodiments about −5° C. Anodization may be performed at a constant voltage, which may be from about 100 V to about 30 V, and in embodiments about 50 V. Anodization may be performed from about 20 minutes to about 5 minutes, and in embodiments may be about 10 minutes. After anodization, the nickel foam is coated with $NiC_2O_4.2H_2O$ bulk crystals. The coated nickel foam is then annealed in an argon atmosphere at a temperature from about 500° C. to about 300° C., which in embodiments may be 400° C. The nickel foam may be annealed from about 1 hour to about 30 minutes, and in embodiments for about 40 minutes. Annealing changes the morphology of the $NiC_2O_4.2H_2O$ bulk crystals to porous rod structure as shown in FIGS. 3a-c. Each of the rods includes a plurality of nanoparticle subunits. Each nanoparticle includes a core consisting substantially of nickel and a shell consisting substantially of carbon-doped nickel oxide as shown in FIGS. 3d-e.

With reference to FIGS. 1 and 7a-b, C doping causes distortion of the local NiO structure due to the mismatch of the radius and coordination number between carbon and Ni atoms. The distortion results in cleavage of Ni—O bond and reduces the coordination number of Ni from 6 to 3. In particular, the carbon dopant substitutionally replaces a third-layer 6-coordinated Ni in NiO. Since the bond length of C—O bond (about 1.4 Å) is much shorter than that of Ni—O bond (about 2.1 Å), the local structure of the NiO near C substitution is strongly distorted. As a result, the O atoms that connect with C are stretched away from the corresponding top-layer Ni and one Ni—O bond breaks. Consequently, the coordination number of top layer Ni decreases from 3 to 2, resulting in a new C doped surface. This in turn, increases the charge density of Ni, where the under-coordinated Ni act as active H adsorption sites in NiO and the high affinity of carbon to oxo groups promote water adsorption or dissociation, which is useful in HER.

The catalyst composition according to the present disclosure may be used in hydrogen evolution reaction (HER), a water splitting electrolysis reaction. The rate of hydrogen generation from the HER according to present disclosure may be affected by the pH and temperature at which HER is carried out. Accordingly, the HER may be carried out at a pH from about 9 to about 13, in embodiments from about 10 to about 12. The HER may also be carried at a temperature from about 22° C. and 100° C., in embodiments from about 30° C. to about 80° C., and in further embodiments, from about 40° C. to about 60° C. HER may be carried with any suitable water, however, certain impurities present in the water may affect the rate of hydrogen generation.

The method for hydrogen generation according to the present disclosure includes providing a carbon-doped NiO composition according to the present disclosure and exposing the catalyst composition to a hydrogen containing compound such as water or an aqueous solution. Exposure to the compound may be carried by placing the catalyst composition in a liquid container.

The hydrogen containing compound may be an aqueous alkaline medium, which may be prepared by dissolving an alkaline compound including alkali metal hydroxides such as lithium hydroxide, sodium hydroxide and potassium hydroxide, and tetraalkylammonium hydroxides such as tetramethylammonium hydroxide and tetraethylammonium hydroxide. Suitable solvents include pure water or water that is mixed with various water-miscible solvents including alcohols such as methyl and ethyl alcohols, dimethylformamide, dimethylacetamide, ethyleneglycol, diethyleneglycol and the like. The aqueous alkaline medium may include from about 1% by to about 30% by weight of the alkaline compound dissolved therein. The generated hydrogen may be collected or syphoned for later use. In further embodiments, the generated hydrogen may be used directly with any system and or apparatus that utilizes hydrogen as a source of fuel, such as a fuel cell.

The following Examples illustrate embodiments of the present disclosure. These Examples are intended to be illustrative only and are not intended to limit the scope of the present disclosure. Also, parts and percentages are by weight unless otherwise indicated. As used herein, "room temperature" or "ambient temperature" refers to a temperature from about 20° C. to about 25° C. and "standard pressure" refers to a pressure about 1 atm. Unless stated otherwise, the Examples were performed at ambient temperature and standard pressure.

EXAMPLES

Example 1

This example describes synthesis of a carbon-doped NiO (C—$Ni_{1-x}$O) catalyst.

The carbon-doped NiO catalyst was prepared using a two-step process illustrated in FIG. 2. Nickel oxalate dihydrate ($NiC_2O_4.2H_2O$) bulk crystals were first uniformly grown on a Ni foam (NF) via anodization at about 50 V in oxalate acid. The NF coated with $NiC_2O_4.2H_2O$ crystals was then annealed in argon atmosphere at about 400° C., which is considerably higher than the decomposition temperature of $NiC_2O_4.2H_2O$.

In particular, a piece of NF having a bulk density of about 350 g/m² (Hefei Kejing Materials Technology Co. Ltd, China) was anodized in a two-electrode system using a piece of Ni foil as the counter electrode in 0.3 M oxalic acid solution (Thermo Fisher Scientific, product no. 171514). The anodization was carried out at the temperature of −5° C. at a constant voltage of about 50 V for approximately 10 min. The anodized NF (nickel oxalate/NF) was then rinsed thoroughly with deionized water and ethanol, successively. The anodized samples were then dried in a vacuum at 100° C. for about 1 hour, and subsequently annealed in argon (Ar) atmosphere (Ar was of ultrahigh purity 99.998%) at 400° C. for about 40 min.

Example 2

This example describes imaging of C—$Ni_{1-x}$O catalyst of Example 1.

The morphology of $NiC_2O_4.2H_2O$ bulk crystals and carbon-doped $Ni_{1-x}$O nanorods grown on NF of the of C—$Ni_{1-x}$O catalyst of Example 1 were determined by scanning electron microscopy (SEM, Hitachi S-4800 II). Crystal structure and elemental mapping were characterized on the carbon-doped $Ni_{1-x}O$ nanoparticle subunit through TEM (Talos F200X).

The decomposition due to annealing changed the morphology of bulk crystals to a porous rod structure as shown in FIGS. 3a-c. Transmission electron microscopy (TEM) images revealed that the rods were composed of small nanoparticle subunits (FIG. 3d). Notably, each nanoparticle has a core-shell structure (FIG. 3e). High resolution-TEM (HR-TEM) image collected from the edge of the nanoparticle showed lattice fringe spacings consistent with d-spacings (111) of about 0.258 nm and crystal planes (200) of about 0.214 nm of NiO (FIG. 3f), which was also consistent with the NiO composition in X-ray diffraction (XRD) pattern, suggesting the shell was NiO. According to the XRD results, the core of the particle was metallic Ni. Electron energy loss spectroscopy (EELS) elemental mapping (FIGS. 4a-d) and line scans (inset of FIG. 4a) were collected from a representative nanoparticle, which also confirmed the copresence of Ni and O in the nanoparticle. The intense O signal obtained at the edge of the nanoparticle again supported the proposed Ni core-NiO shell structure. Significantly, a noticeable amount of carbon signal was also present over the entire nanoparticle, indicating the successful incorporation of carbon doping.

Example 3

This example describes analysis of chemical environment of the $C-Ni_{1-x}O$ catalyst of Example 1.

The local coordination environment of C and O in carbon-doped $Ni_{1-x}O$/NF was characterized by X-ray absorption spectroscopy (XAS) at the C K-edge and O K-edge, respectively. X-ray absorption spectroscopy spectra were measured on Beamline 8.0.1 at the Advanced Light Source (ALS), Lawrence Berkeley National Laboratory (LBNL). Energy resolution was set to 0.2 eV for C and O K-edge XAS spectra, respectively. All spectra were normalized to the incident photon flux with energy calibrations to the known reference samples. All spectra were recorded in the total electron yield (TEY) and total fluorescence yield (TFY) detection modes simultaneously in the XAS experimental chamber, which had the base pressure of better than $1.0 \times 10^{-9}$ torr. In order to avoid the intensive signal interference from the NF, the powders collected from the anodization were used for XRD (Rigaku SmartLab) and XPS (Thermo Scientific ESCALAB 250Xi) analysis. Thermogravimetric analysis (TA 500 Thermoanalyze) was performed in Ar atmosphere from room temperature to about 450° C. with a ramping rate of about 10° C./min.

X-ray photoelectron spectroscopy (XPS) measurements were performed to analyze the chemical environment of each element in carbon-doped NiO (FIG. 5). Ni 2p XPS spectrum exhibited two broad peaks centered at about 862 eV (satellite peak) and about 856 eV, respectively. The latter peak can be deconvoluted into three sub-peaks. The Ni 2p peak at about 854.5 eV was consistent with the previously value reported for $Ni^{2+}$ in NiO, while the peak centered at a higher binding energy of about 857.1 eV corresponds to the signal of $Ni^{3+}$. No metallic Ni signal from the sample was observed. The metallic Ni and Ni—C signals were only observed when the NiO shell was etched away by argon plasma, as evidenced by the peaks at about 852.7 eV in the Ni 2p spectrum and about 283.3 eV in the C 1s spectrum. The results were consistent with the EELS mapping and XRD results, and confirmed the Ni core/NiO shell structure. O 1s XPS spectrum also supports the presence of NiO. The deconvoluted peak located at approximately 529.4 eV suggests O bond with $Ni^{2+}$. In addition, the peak located at about 530.9 eV was assigned to the O adjacent to the Ni vacancy. The presence of the Ni vacancy resulted in valence increase of its vicinity Ni ($Ni^{2+}$ to $Ni^{3+}$) to achieve charge neutrality, which was consistent with the peak at about 857.1 eV in Ni 2p spectrum. C is spectrum showed two peaks centered at approximately 284.6 eV and 288.6 eV, respectively. The former peak was due to the adventitious carbon. The 288.6 eV signal suggests the presence of O—C=O bond, which was consistent with the EELS results and agreed well with the observation of the O is peak of O—C=O at about 532.8 eV. The O—C=O group creates a distinguishable coordination environment of Ni (Ni—O—C=O) in NiO, which leads to an additional signal (Ni—O—C=O) located at 855.7 eV in the Ni 2p spectrum. The atomic concentrations of Ni, O and C (288.6 eV) were calculated to be approximately 53.95%, 44.22%, and 1.83%, respectively.

X-ray absorption near edge spectroscopy (XANES) data of NF substrate and NF decorated with thermally treated $NiC_2O_4.2H_2O$ collected at O and C K-edge (FIG. 6) were also compared. The O K-edge XANES of the annealed $NiC_2O_4.2H_2O$ showed a prominent pre-peak at about 529.8 eV that corresponds to the transition between O is state and the hole state, which is a characteristic signal of the Ni deficient NiO (i.e. $Ni_{1-x}O$). The hybridization of the O 2p orbital with the Ni 4s orbital creates some unoccupied states for transitions in the NiO with energy around 537.5 eV. The presence of Ni vacancies reduces the intensity of 537.5 eV peak. Absorption peaks between 532.7 and 535 eV (shaded region) were observed for the annealed $NiC_2O_4.2H_2O$, which are due to the mixed transitions from O 1s to empty states of high valence Ni ($Ni^{3+}$), and O 1s to the $\pi^*_{C=O}$. NF and thermally treated $NiC_2O_4.2H_2O$ have similar C K-edge spectra except for significantly different peak intensities at approximately 288.6 eV and 290.3 eV. The carbon signals observed for NF substrate originate from adventitious carbon contamination. However, the substantially higher peak intensities of the annealed $NiC_2O_4.2H_2O$ at about 288.6 eV and 290.3 eV are unlikely related to adventitious carbon. Instead, these peaks are attributed to the transition of C 1s to $\pi^*$ and $\sigma^*$ state in O—C=O. Taken together, the XPS and XANES results illustrate that the NiO shell contains Ni vacancies and is Ni deficient and that carbon dopants are substitutionally replacing the Ni positions in $Ni_{1-x}O$. Therefore, this $NiC_2O_4.2H_2O$ derived material is denoted as $C-Ni_{1-x}O$, and subsequent DFT simulation was performed based on this structural model.

DFT calculations were performed with plane-wave basis codes Quantum Espresso (QE), with exception for transition state calculations which were carried out using the plane-wave basis code Vienna Ab Initio Simulation Package (VASP). In all calculations, Perdew-Burke-Erzenhof exchange and correlation functional with Hubbard U correction (PBE+U) was employed. An effective Hubbard U value of 5.3 eV was used. Ultrasoft pseudopotential from GBRV was used with a wavefunction cutoff of 40 Ry and charge density cutoff of 240 Ry. In order to obtain the accurate energy barriers, Nudged Elastic Band (NEB) calculation was first performed to get the approximate saddle point, followed by the further convergence by DIMER calculation. The vibrational frequencies for zero-point energy and entropy were computed by Density Functional Perturbation Theory (DFPT) in Quantum Espresso, and an implicit solvation model was adopted to include the effect of solvent around solid surfaces.

Example 4

This example describes surface and electronic structure of the C—$Ni_{1-x}O$ catalyst of Example 1.

As noted above with respect to FIG. 3f, observed (100) and (111) facets in the HR-TEM image collected from the $Ni_{1-x}O$ shell, both (100) and (111) surface models were built and relaxed for subsequent DFT simulation. The (111) surface has two possible terminations: Ni termination and O termination. Analysis of the surface phase diagram of (111) facet shows that Ni termination is more stable than O termination in the Ni rich environment. Combined with Ni rich synthesis conditions of Example 1, the (111) surface should also be terminated by Ni. In addition, (111) facet tend to have surface reconstruction and the reconstructed surface is thermodynamically more stable than the pristine Ni terminated (111) surface. These results are consistent with the previously reported studies on the thermodynamic stability of NiO polar (111) surface.

With reference to FIG. 7a, about ¾ of the outermost ions and about ¼ of the second outermost ions of the pristine (111) surface (denoted as p-surface) are missing during the surface reconstruction, resulting in a new exposed surface (i.e. octupolar surface, denoted as o-surface in FIG. 7a). Since there are more Ni ions missing compared to ions in the surface reconstruction, Ni vacancies appear on the o-surface. As a result, high valence $Ni^{3+}$ sites are generated to balance the charge. The presence of $Ni^{3+}$ sites is also supported by XPS and XANES results. Furthermore, C substitutional doping was investigated for both (100) and o-surface. However, the only stable structure was obtained when C substitutes one third-layer 6-coordinated Ni (labeled as Ni #2 in FIG. 7a) in o-surface.

Since the bond length of C—O bond (approximately 1.4 Å) is much shorter than that of Ni—O bond (approximately 2.1 Å), the local structure near C substitution is strongly distorted. As a result, the O atoms that connect with C are stretched away from the corresponding top-layer Ni (labeled as Ni #1) and one Ni—O bond breaks. Consequently, the coordination number of top layer Ni decreases from 3 to 2, resulting in a new C doped surface (denoted as C-surface, FIG. 7b). It was noted that for the C-surface, three C—O bonds have the same bond length of about 1.30 Å (between the bond length of C—O and C=O), the angles between three O—C=O are the same and the centered C is on the same plane with the nearby three O. The information supported the conclusion that the C forms $sp^2$ hybridization with three connected O, consistent with the observation of both C $1s \rightarrow \pi^*_{O-C=O}$ and $1s \rightarrow \sigma^*_{O-C=O}$ transitional signals in XANES spectra (FIG. 6).

With reference to FIG. 7b, C-surface has two structural characteristics, Ni vacancy and C doping. Their effects on HER performance of NiO were studied separately and are described below in Example 6. The investigation on Ni vacancy was made through the comparison between o-surface and p-surface, as o-surface had Ni vacancies while p-surface did not. After carefully considering all possible H adsorption sites on both surfaces, it was noticed that the existence of Ni vacancy did not increase the number of active sites toward H adsorption per unit area of the o-surface compared to p-surface. Then the effect of C doping was studied for both Ni vacancy resided C-surface and o-surface. Performance of catalysts is strongly related to their electronic structure, which can be tuned by dopants.

FIGS. 9a and b show projected density of states (PDOS) plots of the Ni 3d and O 2p orbitals of the first three layers from the o-surface and C-surface of FIGS. 7a and b. To gain an in-depth understanding of the electronic structure of C-surface, projected density of states (PDOS) of the C-surface structure were plotted and compared to the PDOS of the o-surface (FIGS. 9a and b). The PDOS plots showed that the C doping significantly reduced the band gap from about 1.5 eV to about 0.6 eV. This indicated that the conductivity of $Ni_{1-x}O$ was improved after C doping, which is beneficial for the electron transport in HER. Further analysis revealed that the narrowed band gap was caused by the downshifting of the majority (spin up) conduction band minimum (CBM) to below the Fermi level and overlapping with valence band maximum (VBM), moving the VBM closer to the Fermi level (FIGS. 9a and b). The change of PDOS can be attributed to the C doping mediated change of the local structure of top layer Ni. One of the three Ni (#1)-O bonds in o-surface was broken due to the strong stretch applied by the short C—O bond nearby, which endowed the top layer Ni (#1') on C-surface with higher electron density, thus, upshifts the VBM. The PDOS change of the top layer Ni on o-surface (Ni #1) and C-surface (Ni #1') also confirmed the effect of C doping, because the majority (spin up) CBM shifts down to below the Fermi level as well, and mixes with the VBM, resulting in the VBM upshifting to around the Fermi level (FIGS. 9c and d). The comparison of charge density mapping of the top layer Ni sites (#1 and 1') on o-surface and C-surface showed clear evidence that the electron density for the top layer Ni (#1) was largely increased after C doping (FIG. 8). Although carbon is a n-type doping, it did not change the NiO from p-type to n-type. This is because the concentration of electrons is not enough to compensate the majority holes in the NiO lattice, as evidenced by the nearly same work function before and after C doping. To quantify the charge density change of the top layer Ni (#1 and 1'), the analysis of atomic charge difference ($\Delta Q$) was performed according to the following equation (1), based on Bader charge partitioning scheme:

$$\Delta Q = Q_{surface} - Q_{bulk} \quad (1)$$

In equation (1), $Q_{surface}$ is the amount of electrons carried by the surface ions, and $Q_{bulk}$ is the amount of electrons of the corresponding ions in the bulk structure. Thus, a larger $\Delta Q$ represents a higher electron density carried by the surface ion. The $\Delta Q$ for the top layer Ni (#1') from C-surface is 0.636, which is considerably larger than the value of 0.168 obtained from the Ni (#1) on o-surface, again confirmed higher electron density on the top layer Ni (#1') on C-surface. The larger electron density on Ni sites is believed to be helpful for H adsorption, as Ni donates electrons to H in the Ni—H bond owing to the larger electronegativity of H (the electronegativity of Ni is 1.8, which is smaller than that of 2.1 of H).

Example 5

This example describes hydrogen absorption profile of the C—$Ni_{1-x}O$ catalyst of Example 1.

Compared to o-surface, carbon doping not only enhanced the H adsorption activity of previously existed sites, but also exposed newly active H adsorption sites. Specifically, the improvement of H adsorption activity over old sites can be concluded by comparing the H adsorption onto single-fold sites (Ni #1 and #1') or three-fold hollow sites. $\Delta G^*_H$ of the top layer Ni (#1') on C-surface (structure 4 in FIG. 10) had a much smaller value of 0.282 eV than the value of 0.935 eV obtained from the identical Ni (#1) on o-surface (structure 5 in FIG. 10), as suggested by the PDOS, the charge density mapping and $\Delta Q$ analysis. In addition, the hollow sites on C-surface (Ni #4', 5' and 6', structure 2 in FIG. 10) also showed a smaller $\Delta G^*_H$ value of about 0.104 eV compared to the value of 0.152 eV obtained from the identical hollow sites on o-surface (Ni #4, 5 and 6, structure 3 in FIG. 10). On the other hand, the newly exposed bridge sites (Ni #1' and 3', structure 1 in FIG. 10) of the C-surface exhibit an almost thermoneutral $\Delta G^*_H$ value of 0.031 eV, indicating that the introduced new sites by carbon doping were favorable for the adsorption of H.

Furthermore, it was also demonstrated that $\Delta G^*_H$ strongly depended on the $\Delta Q$ of Ni as well as the number of Ni sites that H bonds to. A plot of the change of $\Delta G^*_H$ against these two variables is depicted in FIG. 10. The comparison between one-fold Ni sites (e.g. Ni #1' and Ni #1 in structure 4 and 5, respectively) shows that structure 4 with larger $\Delta Q$ exhibits smaller $\Delta G^*_H$ (0.282 eV) than structure 5 (0.935 eV). This is because the higher electron density on Ni site makes it easier for H to bind with the Ni site. When the structures (e.g. structure 3 and 5) have similar $\Delta Q$, increasing the number of Ni sites that H bonds to can largely shift down the $\Delta G^*_H$ from 0.935 eV to 0.152 eV, which is due to the stronger interaction between H and multi-fold Ni. Similar trend was observed by comparing structure 2 with structure 5. This suggests that increased electron density or multi-folds of H binding sites are the underlying reasons for the easier adsorption of H on Ni sites in $Ni_{1-x}O$ system.

Example 6

This example describes HER performance of the $C-Ni_{1-x}O$ catalyst of Example 1.

The electrochemical performances of $C-Ni_{1-x}O$ were investigated in a three-electrode system, with Hg/HgO (1M KOH, Thermo Fisher Scientific, product no. 178481) and graphite rod as the reference electrode, and counter electrode, respectively. Before measurement, Hg/HgO reference electrode was corrected against reversible hydrogen electrode (RHE). The HER performance data was collected in a nitrogen-saturated 1.0 M KOH electrolyte. All of the working electrodes were CV conditioned from about 0.33 V to about −0.32 V vs. RHE at a scan rate of about 50 mV/s for 50 cycles to ensure wetting of the electrodes, followed by an LSV measurement at a scan rate of about 1 mV/s. Electrochemical impedance spectroscopy (EIS) was performed at the potential of −0.15 V vs. RHE, with frequency from 100 kHz to 1 Hz and an amplitude of 5 mV. The LSV was iR corrected based on the EIS results. Mott-Schottky measurements were performed on the $C-Ni_{1-x}O$ at a frequency of 1,000 Hz under a stable open circuit potential of −0.03 V vs. Hg/HgO.

The HER performances of $C-Ni_{1-x}O$ were characterized in nitrogen-saturated 1.0 M KOH through linear sweep voltammetry (LSV) at a scan rate of about 1 mV/s (FIG. 11). A control sample without carbon doping was prepared by annealing $C-Ni_{1-x}O$ in air ($C-Ni_{1-x}O$-Air). The control sample was prepared by annealing $C-Ni_{1-x}O$ in air at 400° C. for 10 min. $C-Ni_{1-x}O$-Air, NF, and a conventional platinum-on-carbon catalyst (Pt/C) (10 wt. % Pt) were also measured under the same conditions for comparison.

Pt/C electrode was prepared using 5 mg of the Pt/C (about 10 wt. % of Pt) dispersed in the mixture of approximately 958 µL ethanol and 20 µL of deionized $H_2O$. 22 µL of Nafion (5 wt. %) was added as the binder. Subsequently, the mixture was sonicated for about 30 min to disperse the catalyst powders. Pt/C ink was drop cast on the glassy carbon electrode with an areal mass loading of about 1 mg/cm² and dried in air.

Prior to the measurement, all of the electrodes were conditioned through cyclic voltammetry to wet the electrode structure. XPS and XANES characterizations confirmed that the conditioning did not change the chemical nature of $C-Ni_{1-x}O$. It was noted that NiO was the thermodynamically stable phase in the potential window between 0 and −174 mV vs. RHE according to the NiO pourbaix diagram. The presence of overpotential of NiO reduction further expanded this potential window. $C-Ni_{1-x}O$ achieved an ultralow overpotential of about 27 mV at the geometric current density ($j_{geo}$) of 10 mA/cm², which is comparable with the 14 mV of the benchmark Pt/C catalyst at the same current density.

The performance comparison between NF and $C-Ni_{1-x}O$ excluded the substrate contribution to the ultralow overpotential. $C-Ni_{1-x}O$-Air exhibited an overpotential of about 190 mV at $j_{geo}$ of about 10 mA/cm². Although this value is better than that of Ni foam, which is about 260 mV, it is substantially worse than the performance of $C-Ni_{1-x}O$. This suggests that the improved overpotential of $C-Ni_{1-x}O$ is due to carbon doping, which is consistent with the simulation results. The total electrode activity is determined by two major factors, the intrinsic activity of the catalyst and the quantity of active sites (or the electrochemical surface area, ECSA) that is electrolyte accessible. To evaluate the intrinsic activity of $C-Ni_{1-x}O$, its current was normalized to ECSA (FIG. 12). Significantly, $C-Ni_{1-x}O$ still showed substantially larger HER current density than that of $C-Ni_{1-x}O$-Air, NF, and Pt/C samples at the same overpotentials under the same measurement conditions. According to the DFT calculations, the excellent intrinsic activity of $C-Ni_{1-x}O$ can be attributed to the improved H adsorption activity of Ni sites as a result of carbon doping.

In addition, Tafel plots of FIG. 13 provide insight into the rate limiting step of HER. $C-Ni_{1-x}O$ exhibited a Tafel slope of approximately 36 mV/dec, which is comparable with the slope of Pt/C (29 mV/dec), but much smaller than that of $C-Ni_{1-x}O$-Air (109 mV/dec) and NF (94 mV/dec). This small Tafel slope value suggested that the Heyrovsky step ($*H+H_2O+e^- \rightleftharpoons *H_2+OH^-$), in which water molecules are dissociated to provide protons for the generation of dihydrogen, is the rate limiting step.

The enhanced HER performances of $C-Ni_{1-x}O$ was also evidenced by the small charge transfer resistance ($R_{ct}$ of about 4.03 Ω/cm²), which is almost 27 times lower than that of NF ($R_{ct}$ of about 108 Ω/cm²), indicating the efficient electron transfer kinetics $C-Ni_{1-x}O$ during HER process (FIG. 14). In comparison to other Ni and NiO based HER catalysts, $C-Ni_{1-x}O$ exhibits considerably smaller overpotential (at $j_{geo}$ of about 10 mA/cm²) and Tafel slope (FIG. 15). Furthermore, the $C-Ni_{1-x}O$ catalyst showed excellent stability at both low (5 mA/cm²) and high (60 mA/cm²) current densities. The initial current drop in the first two hours is possibly due to the dynamic process of reaching an equilibrium between gas evolution and electrolyte diffusion. The current level became stable after achieving the dynamic equilibrium. Notably, the same current drop profile and the same current level were observed after the replacement of electrolyte (60-135 hours). This is a direct evidence that this current drop is not stemmed from catalyst's compositional change or active site failure. An accelerated degradation measurement was also performed through cyclic voltammetry (CV) for 10,000 cycles at a scan rate of 100 mV/s (FIG. 16). The total electrode activity is comparable before and after 10,000 cycles, with an overpotential of 27 mV slightly increased to about 32 mV at the $j_{geo}$ of about 10 mA/cm² after the test. It was also noted that the intrinsic activity ($j_{ECSA}$) remained the same before and after the 10,000 cycles (inset of FIG. 16).

Example 7

This example describes water dissociation pathway of the C—$Ni_{1-x}$O catalyst of Example 1.

The Tafel plot for C—$Ni_{1-x}$O of FIG. 13 indicated that the Heyrovsky step is the rate limiting step for C—$Ni_{1-x}$O HER catalyst. Therefore, water dissociation energy barrier calculation was performed based on the Heyrovsky step for both o-surface and C-surface. All of the initial state (IS), transition state (TS) and final state (FS) structures for both surfaces in Heyrovsky step are shown together with their energy profile in FIG. 17. For o-surface, initially, $H_2O$ approached to the top layer Ni due to the Van der Waals interaction while a H atom bonds to the adsorption favorable hollow sites of the third layer Ni (Octopolar IS). Subsequently, H—OH bond was cleaved simultaneously with the formation of Ni—OH bond, which is beneficial for lowering the energy of the $H_2O$/o-surface system (Octopolar TS). The accompanied energy barrier of the Heyrovsky step on o-surface was calculated to be about 1.17 eV.

C-surface had a completely different reaction pathway. In particular, $H_2O$ was found to preferably stay on the top of carbon dopant through the strong affinity of carbon towards oxo groups (C doped IS). This observation is consistent with our hypothesis that carbon is a water adsorption site. $H_2O$ was then dissociated with the assistance of the carbon dopant in the TS, which exhibits a lower activation energy barrier of about 0.81 eV compared to the energy barrier of about 1.17 eV of the o-surface. The lowered energy barrier of Heyrovsky step on C-surface is attributed to the unique C—O3 local structure. Since the carbon dopant forms $sp^2$ hybridization structure with the nearby three oxygen, delocalized electrons of the π bond in this C—O3 structure increases the electron density around the carbon center. Combined with the vertical orientation characteristic of the $p_z$ orbital of carbon dopant, it can be expected that the overlapping of the $p_z$ orbital of carbon with the hybridized p orbital of O (in $H_2O$) could be facilitated, which helps form a strong C—OH bond and release more energy. This is also supported by the calculations that the C—OH bond energy of about 504 kJ/mol in TS of C-surface is higher than the bond energy of about 448 kJ/mol of Ni—OH in the TS of o-surface. These calculations provide important insights, for the first time, into the favorable HER reaction pathway on $Ni_{1-x}$O and clarify that carbon dopant, due to the unique C—O3 local $sp^2$ hybridization structure, is the "hot-spot" for water dissociation.

It will be appreciated that of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, or material.

What is claimed is:

1. A catalyst composition comprising:
   nickel foam; and
   a plurality of carbon-doped nickel oxide nanorods disposed on the nickel foam.

2. The catalyst composition according to claim 1, wherein each of the carbon-doped nickel oxide nanorods includes a plurality of nanoparticle subunits each having a core covered by a carbon-doped nickel oxide shell.

3. The catalyst composition according to claim 2, wherein the core consists substantially of nickel.

4. The catalyst composition according to claim 2, wherein the carbon-doped nickel oxide shell consists substantially of nickel oxide.

5. The catalyst composition according to claim 4, wherein the carbon-doped nickel oxide shell includes a carbon-doped surface.

6. The catalyst composition according to claim 5, wherein the carbon-doped surface includes a carbon atom bonded to three oxygen atoms in a same plane.

7. The catalyst composition according to claim 5, wherein the carbon-doped surface includes a carbon atom that substitutionally replaced a third-layer 6-coordinate nickel atom in the nickel oxide.

8. The catalyst composition according to claim 1, wherein the catalyst composition has an overpotential of about 27 millivolts at a geometric current density of about 10 milliamps per square centimeter.

9. A method for forming a catalyst composition, the method comprising:
   anodizing nickel foam to form an anodized nickel foam having a plurality of $NiC_2O_4.2H_2O$ bulk crystals on the nickel foam; and
   annealing the anodized nickel foam to form a plurality of carbon-doped nickel oxide nanorods disposed on the anodized nickel foam.

10. The method according to claim 9, wherein annealing the anodized nickel foam includes changing morphology of the plurality of $NiC_2O_4.2H_2O$ bulk crystals into the plurality of carbon-doped nickel oxide nanorods.

11. The method according to claim 10, wherein anodizing the nickel foam includes anodizing the nickel foam with a nickel electrode in an oxalic acid solution.

12. The method according to claim 11, wherein anodizing the nickel foam is performed at a temperature from about −10° C. to about 0° C. at a constant voltage from about 100 V to about 30 V for a period of time from about 20 minutes to about 5 minutes.

13. The method according to claim 9, wherein the nickel foam has a bulk density from about 400 grams per square meter to about 300 grams per square meter.

14. The method according to claim 9, wherein annealing is performed in an argon atmosphere at a temperature from about 500° C. to about 300° C. for a period of time from about 1 hour to about 30 minutes.

15. A method for producing hydrogen, the method comprising:
   contacting at least one hydrogen-containing compound with a catalyst composition under conditions suitable for dehydrogenating the at least hydrogen-containing compound to form hydrogen, wherein the catalyst composition includes:
   nickel foam; and
   a plurality of carbon-doped nickel oxide nanorods disposed on the nickel foam.

16. The method according to claim 15, wherein each of the carbon-doped nickel oxide nanorods includes a plurality of nanoparticle subunits each having a core covered by a carbon-doped nickel oxide shell.

17. The method according to claim 16, wherein the core consists substantially of nickel and the carbon-doped nickel oxide shell consists substantially of nickel oxide and includes a carbon-doped surface.

18. The method according to claim 17, wherein the carbon-doped surface includes a carbon atom bonded to three oxygen atoms in a same plane.

19. The method according to claim 18, wherein the carbon-doped surface includes a carbon atom that substitutionally replaced a third-layer 6-coordinate nickel atom in the nickel oxide.

* * * * *